United States Patent
Kuang

(10) Patent No.: US 10,925,029 B2
(45) Date of Patent: Feb. 16, 2021

(54) WI-FI ACCESS POINT-BASED POSITIONING METHOD AND DEVICE

(71) Applicant: Huawei Technologies Co., Ltd., Shenzhen (CN)

(72) Inventor: Yunsheng Kuang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/472,745

(22) PCT Filed: Dec. 22, 2016

(86) PCT No.: PCT/CN2016/111446
§ 371 (c)(1),
(2) Date: Jun. 21, 2019

(87) PCT Pub. No.: WO2018/112825
PCT Pub. Date: Jun. 28, 2018

(65) Prior Publication Data
US 2020/0305111 A1     Sep. 24, 2020

(51) Int. Cl.
*H04W 64/00*     (2009.01)
*G01S 5/02*     (2010.01)
(Continued)

(52) U.S. Cl.
CPC ......... *H04W 64/003* (2013.01); *G01S 5/0252* (2013.01); *H04B 17/318* (2015.01); *H04W 24/08* (2013.01)

(58) Field of Classification Search
CPC ..... H04W 4/029; H04W 64/00; H04W 88/08; H04W 84/005; H04W 84/12;
(Continued)

(56) References Cited

U.S. PATENT DOCUMENTS 8,412,234 B1 *   4/2013   Gatmir-Motahari ...................... G01S 5/0252
                                                                                                    455/456.1
8,571,578 B1 *   10/2013   Chen .................... G01S 5/0009
                                                                                                    455/456.1
(Continued)

FOREIGN PATENT DOCUMENTS

CN     103081544 A     5/2013
CN     103200676 A     7/2013
(Continued)

OTHER PUBLICATIONS

Chen Lina, "Research on Major Technology of Using WLAN and Fingerprint for Indoor Positioning," East China Normal University, Communication and Information System, 2014, Issue 10, 1 page.
(Continued)

*Primary Examiner* — Daniel Lai
(74) *Attorney, Agent, or Firm* — Slater Matsil, LLP

(57) ABSTRACT

Embodiments of the present invention relate to a mobile Wi-Fi access point determining method, a Wi-Fi access point-based positioning method, a Wi-Fi AP determining device, and a Wi-Fi-based positioning device. The method includes: determining a signal graph of each of a plurality of Wireless Fidelity access points Wi-Fi APs in a positioning area; estimating a Wi-Fi AP location based on the Wi-Fi AP signal graph; determining a divergence of the Wi-Fi AP signal graph based on the estimated Wi-Fi AP location; determining, based on the divergence of the Wi-Fi AP signal graph, whether the Wi-Fi AP is a mobile Wi-Fi AP; when the Wi-Fi AP is a mobile Wi-Fi AP, deleting the mobile Wi-Fi AP from a fingerprint database; and finally determining a positioning result of an apparatus whose signal strength is obtained. Positioning accuracy is improved in the embodiments of the present invention.

20 Claims, 15 Drawing Sheets

(51) Int. Cl.
*H04B 17/318* (2015.01)
*H04W 24/08* (2009.01)

(58) Field of Classification Search
CPC ... H04W 64/003; H04W 24/02; H04W 4/023; H04W 4/33; H04W 4/021; H04W 4/025; H04W 84/18; H04W 4/70; H04W 92/20; H04W 4/02; H04W 4/30; H04W 4/38; H04W 12/00503; H04W 4/024; H04W 36/30; H04W 40/12; H04W 4/00; H04W 24/04; H04W 4/80; H04W 24/08; G01S 5/0252; G01S 11/06; G01S 5/0236; G01S 5/14; G01S 5/0027; G01S 5/0221; G01S 5/0284; G01S 5/00; G01S 5/0036; G01S 5/02; G01S 5/0205; G01S 5/02521; G01S 5/02523; G01S 5/0263; G01S 5/0278; G01S 5/0242; G01S 5/0257; G01S 5/04; G01S 5/06; H04B 17/318; H04B 17/336; H04B 17/309; G06Q 30/0261
See application file for complete search history.

(56) References Cited

U.S. PATENT DOCUMENTS

| | | |
|---|---|---|
| 2012/0225678 A1 | 9/2012 | Cha et al. |
| 2013/0188508 A1 | 7/2013 | Cho et al. |
| 2015/0031390 A1* | 1/2015 | Robertson ............ G01C 21/206 455/456.1 |
| 2015/0087239 A1 | 3/2015 | Yang et al. |
| 2015/0230100 A1* | 8/2015 | Atia ...................... H04W 16/20 370/252 |
| 2015/0287239 A1 | 10/2015 | Berghoff |
| 2015/0358936 A1* | 12/2015 | Kao ...................... G01S 5/0278 455/456.1 |
| 2016/0011294 A1 | 1/2016 | Kim et al. |
| 2016/0189416 A1 | 6/2016 | Naguib et al. |
| 2016/0345289 A1 | 11/2016 | Mayor et al. |
| 2018/0098196 A1* | 4/2018 | Dal Santo ............... H04L 67/02 |

FOREIGN PATENT DOCUMENTS

| | | |
|---|---|---|
| CN | 103209478 A | 7/2013 |
| CN | 103796305 A | 5/2014 |
| CN | 104540218 A | 4/2015 |
| CN | 104853317 A | 8/2015 |
| CN | 105282758 A | 1/2016 |
| CN | 105338498 A | 2/2016 |
| CN | 105430740 A | 3/2016 |
| CN | 105704652 A | 6/2016 |
| CN | 105900501 A | 8/2016 |
| CN | 106028275 A | 10/2016 |
| CN | 105472621 B | 11/2018 |
| WO | 2015187726 A1 | 12/2015 |

OTHER PUBLICATIONS

Intel Corp., "Report on RAN2 email discussion: [91#27][LTE/WiFi] RRM Measurement Framework for WLAN", 3GPP TSG-RAN2 Meeting #91-bis, R2-154395, Malmo, Sweden, Oct. 4-10, 2015, 28 pages.

Qin, Z., "Research on Fusion Base on WiFi Signal Intensity and Inertial Measurement Information of Indoor Position", A Thesis Submitted to Chongqing University in Partial Fulfillment of the Requirement for the Master's Degree of Engineering, Jun. 15, 2016, 80 pages.

* cited by examiner

WI-FI ACCESS POINT-BASED POSITIONING METHOD AND DEVICE

CROSS REFERENCE TO RELATED APPLICATIONS

This application is a National Stage of International Application No. PCT/CN2016/111446, filed on Dec. 22, 2016, which is hereby incorporated by reference in its entirety.

TECHNICAL FIELD

Embodiments of the present invention relate to the wireless communications field, and in particular, to WI-FI access point-based positioning.

BACKGROUND

People's huge demand for the mobile Internet pushes rapid deployment of Wireless Fidelity (WI-FI for short) access points (AP for short). A large quantity of WI-FI APs start to be deployed in more indoor scenarios, such as a supermarket, an office building, and a station, to meet people's need to access a mobile network. This also makes it possible to use a WI-FI AP signal for indoor positioning. An indoor positioning service provider can use a deployed WI-FI AP to implement an indoor positioning function, and therefore a biggest bottleneck that a WI-FI AP needs to be deployed for indoor positioning is eliminated and does not restrict implementation of a WI-FI indoor positioning solution in the market. The WI-FI indoor solution is expected to be widely used at indoor sites such as a supermarket and an office building, to provide a convenient and efficient indoor positioning service and indoor positioning experience for a user and also provide a service application with high added value for a merchant.

Currently, mainstream map vendors at home and abroad, such as BAIDU, AUTO NAVI, and GOOGLE embed indoor maps in their applications. The indoor maps basically cover large business districts and important buildings such as railway stations and airports in major cities at home and abroad. A large quantity of indoor maps also promote application of the indoor positioning solution.

The existing WI-FI positioning solution mainly includes three-point positioning based on ranging, angle measurement positioning based on azimuth measurement, time difference of arrival (TDOA for short) positioning based on a signal time difference, and fingerprint positioning based on location fingerprint matching.

WI-FI fingerprint positioning is currently a commonly used positioning method in the industry. Compared with other algorithms, the WI-FI fingerprint positioning has an advantage that only a fingerprint in a positioning area needs to be collected to implement positioning without obtaining a deployment location of a WI-FI AP, making it easier to promote the application.

However, the existing WI-FI fingerprint positioning has a problem of low positioning accuracy.

SUMMARY OF THE INVENTION

Embodiments of the present invention provide a WI-FI access point-based positioning method and device, to identify and screen out a mobile WI-FI AP, thereby improving WI-FI fingerprint positioning accuracy.

According to a first aspect, an embodiment of the present invention provides a mobile Wireless Fidelity access point WI-FI AP determining method.

The method includes: first determining a signal graph of each of a plurality of Wireless Fidelity access points WI-FI APs in a positioning area, where the WI-FI AP signal graph includes coordinates of a plurality of reference points and a WI-FI AP signal strength corresponding to coordinates of each reference point; then estimating a WI-FI AP location based on the WI-FI AP signal graph; determining a divergence of the WI-FI AP signal graph based on the estimated WI-FI AP location; and finally determining, based on the divergence of the WI-FI AP signal graph, whether the WI-FI AP is a mobile WI-FI AP.

According to a second aspect, an embodiment of the present invention provides a mobile Wireless Fidelity access point WI-FI AP determining device. The device includes a signal graph determining unit, a location estimation unit, a divergence determining unit, and a mobile AP determining unit.

The signal graph determining unit is configured to determine a signal graph of each of a plurality of Wireless Fidelity access points WI-FI APs in a positioning area, where the WI-FI signal graph includes coordinates of a plurality of reference points and a WI-FI AP signal strength corresponding to coordinates of each reference point. The location estimation unit is configured to estimate a WI-FI AP location based on the WI-FI AP signal graph. The divergence determining unit is configured to determine a divergence of the WI-FI AP signal graph based on the estimated WI-FI AP location. The mobile AP determining unit is configured to determine, based on the divergence of the WI-FI AP signal graph, whether the WI-FI AP is a mobile WI-FI AP.

In this embodiment of the present invention, the WI-FI AP location is estimated based on the WI-FI AP signal graph, so as to determine the divergence of the WI-FI AP signal graph, and determine, based on the divergence of the WI-FI AP signal graph, whether the corresponding WI-FI AP is a mobile AP. Therefore, this embodiment of the present invention provides a method for identifying a mobile AP in a WI-FI fingerprint database.

In an example, the divergence of the WI-FI AP signal graph is a divergence degree between the reference points in the WI-FI AP signal graph and the estimated WI-FI AP location.

In an example, the estimating a WI-FI AP location based on the WI-FI AP signal graph includes: dividing a signal strength change range in the WI-FI AP signal graph into a plurality of signal strength change intervals; and separately estimating, based on coordinates of reference points corresponding to the plurality of signal strength change intervals, a plurality of WI-FI AP locations corresponding to the plurality of signal strength change intervals.

In an example, the determining a divergence of the WI-FI AP signal graph based on the estimated WI-FI AP location includes: determining, based on the plurality of separately estimated WI-FI AP locations corresponding to the plurality of signal strength change intervals, a plurality of divergences respectively corresponding to the plurality of signal strength change intervals.

In an example, the determining, based on the divergence of the WI-FI AP signal graph, whether the WI-FI AP is a mobile WI-FI AP includes: if smaller endpoint values of a signal strength change interval indicate a larger divergence corresponding to the signal strength change interval, or if larger endpoint values of a signal strength change interval indicate a smaller divergence corresponding to the signal strength change interval, determining that the WI-FI AP is a mobile WI-FI AP.

In an example, the estimating a WI-FI AP location based on the WI-FI AP signal graph includes: obtaining, based on the WI-FI AP signal graph, coordinates of each reference point corresponding to the WI-FI AP, and estimating the WI-FI AP location by using a weighting algorithm, where a weight of the weighting algorithm is determined by a signal strength of a corresponding reference point.

In an example, the estimating a WI-FI AP location based on the WI-FI AP signal graph includes:
calculating $$L^* = \sum_{i=1}^{N} w_i L_i$$

based on the WI-FI AP signal graph, to obtain the WI-FI AP location, where L* is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the determining a divergence of the WI-FI AP signal graph based on the estimated WI-FI AP location includes: calculating an average value of Euclidean distances between the plurality of reference points in the WI-FI AP signal graph and the estimated WI-FI AP location, and determining the average value as the divergence of the WI-FI AP signal graph.

In an example, the determining a divergence of the WI-FI AP signal graph based on the estimated WI-FI AP location is specifically:
calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i^{(x)}$ is a horizontal coordinate of the $i^{th}$ reference point in the WI-FI AP signal graph, $L_i(y)$ is a vertical coordinate of the $i^{th}$ reference point in the WI-FI AP signal graph, L*(x) is a horizontal coordinate of the estimated WI-FI AP location, L*(y) is a vertical coordinate of the estimated WI-FI AP location, and $N_j$ is a quantity of reference points.

In an example, before the determining a signal graph of each of a plurality of Wireless Fidelity access points WI-FI APs in a positioning area, the method includes: obtaining a plurality of WI-FI AP signal strength values of each reference point in the positioning area, calculating a variance of the plurality of values, and when the variance is less than a variance threshold, performing the step of determining a signal graph of each of a plurality of Wireless Fidelity access points WI-FI APs in a positioning area.

In an example, the determining, based on the divergence of the WI-FI AP signal graph, whether the WI-FI AP is a mobile WI-FI AP includes: when the divergence is greater than an outdoor divergence threshold, determining that the WI-FI AP is a mobile WI-FI AP.

According to a third aspect, an embodiment of the present invention provides a Wireless Fidelity WI-FI-based positioning method.

The method includes: first determining a signal graph of each of a plurality of Wireless Fidelity access points WI-FI APs in a positioning area, where the WI-FI AP signal graph includes coordinates of a plurality of reference points and a WI-FI AP signal strength corresponding to coordinates of each reference point; then estimating a WI-FI AP location based on the WI-FI AP signal graph; determining a divergence of the WI-FI AP signal graph based on the estimated WI-FI AP location; determining, based on the divergence of the WI-FI AP signal graph, whether the WI-FI AP is a mobile WI-FI AP; when the WI-FI AP is a mobile WI-FI AP, deleting the mobile WI-FI AP from a fingerprint database; and finally matching an obtained signal strength in the positioning area with a signal strength of each reference point in the fingerprint database, to determine a positioning result of an apparatus whose signal strength is obtained.

According to a fourth aspect, an embodiment of the present invention provides a Wireless Fidelity WI-FI-based positioning device. The positioning device includes a signal graph determining unit, a location estimation unit, a divergence determining unit, a mobile AP determining unit, an AP screening unit, and a positioning unit.

The signal graph determining unit is configured to determine a signal graph of each of a plurality of Wireless Fidelity access points WI-FI APs in a positioning area, where the WI-FI AP signal graph includes coordinates of a plurality of reference points and a WI-FI AP signal strength corresponding to coordinates of each reference point. The location estimation unit is configured to estimate a WI-FI AP location based on the WI-FI AP signal graph. The divergence determining unit is configured to determine a divergence of the WI-FI AP signal graph based on the estimated WI-FI AP location. The mobile AP determining unit is configured to determine, based on the divergence of the WI-FI AP signal graph, whether the WI-FI AP is a mobile WI-FI AP. The AP screening unit is configured to: when the WI-FI AP is a mobile WI-FI AP, delete the mobile WI-FI AP from a fingerprint database. The positioning unit is configured to match an obtained signal strength in the positioning area with a signal strength of each reference point in the fingerprint database, to determine a positioning result of an apparatus whose signal strength is obtained.

In this embodiment of the present invention, a mobile AP is identified, and the mobile AP is deleted from the WI-FI fingerprint database, to improve WI-FI fingerprint positioning accuracy and also reduce computational complexity.

In an example, the mobile Wireless Fidelity access point WI-FI AP determining device provided in this embodiment of the present invention is a collection terminal or a positioning server.

In an example, the estimating a WI-FI AP location based on the WI-FI AP signal graph includes: calculating $$L^* = \sum_{i=1}^{N} w_i L_i$$

based on the WI-FI AP signal graph, to obtain the WI-FI AP location, where L* is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the determining a divergence of the WI-FI AP signal graph based on the estimated WI-FI AP location includes: calculating an average value of Euclidean distances between the plurality of reference points in the WI-FI AP signal graph and the estimated WI-FI AP location, and determining the average value as the divergence of the WI-FI AP signal graph.

In an example, the determining a divergence of the WI-FI AP signal graph based on the estimated WI-FI AP location is specifically: calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(Y)$ is a vertical coordinate of the estimated WI-FI AP location, and $N_j$ is a quantity of reference points.

In an example, before the determining a signal graph of each of a plurality of Wireless Fidelity access points WI-FI APs in a positioning area, the method includes: obtaining a plurality of WI-FI AP signal strength values of each reference point in the positioning area, calculating a variance of the plurality of values, and when the variance is less than a variance threshold, performing the step of determining a signal graph of each of a plurality of Wireless Fidelity access points WI-FI APs in a positioning area.

In an example, the matching an obtained signal strength in the positioning area with a signal strength of each reference point in the fingerprint database, to determine a positioning result of an apparatus whose signal strength is obtained includes:

calculating a Euclidean distance $$d_i = \frac{\sqrt{\sum_{j=1}^{M} (RSSI^j - RSS_i^j)^2}}{M}, i = 1, 2, \ldots, N,$$

where $RSSI^j$ is a signal strength of a $j^{th}$ WI-FI AP at an $I^{th}$ reference point in the positioning area, $RSS_i^j$ is a signal strength of the $j^{th}$ WI-FI AP at an $i^{th}$ reference point in the fingerprint database, N is a quantity of reference points in the fingerprint database, and M is a quantity of WI-FI APs in the fingerprint database; and obtaining n shortest Euclidean distances from the Euclidean distance di to obtain the positioning result L, where $$L = \sum_{i=1}^{n} w_i d_i, w_i = \frac{1/RSS_i}{\sum_{j=1}^{N} 1/RSS_j}, i = 1, 2, \ldots, N,$$

$RSS_i$ represents a signal strength of an $i^{th}$ reference point in the WI-FI AP signal graph, and $RSS_j$ represents a signal strength of a $j^{th}$ reference point in the WI-FI AP signal graph.

According to a fifth aspect, an embodiment of the present invention provides a collection terminal. The collection terminal includes a receiver, a processor, and a transmitter. The receiver is configured to receive broadcast frames from a plurality of Wireless Fidelity access points WI-FI APs in a positioning area. The processor is configured to: determine a signal graph of each WI-FI AP based on the broadcast frames corresponding to the WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; and determine, based on the divergence of the WI-FI AP signal graph, whether the WI-FI AP is a mobile WI-FI AP. The transmitter is configured to send information about a determined mobile WI-FI AP to a positioning server.

In an example, the processor is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor is further configured to determine, based on the plurality of separately estimated WI-FI AP locations corresponding to the plurality of signal strength change intervals, a plurality of divergences respectively corresponding to the plurality of signal strength change intervals.

In an example, the processor is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor is further configured to calculate $$L^* = \sum_{i=1}^{N} w_i L_i$$

based on the WI-FI AP signal graph, to obtain the WI-FI AP location, where L* is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the processor is further configured to: calculate an average value of Euclidean distances between the plurality of reference points in the WI-FI AP signal graph and the estimated WI-FI AP location, and determine the average value as the divergence of the WI-FI AP signal graph.

In an example, that the processor determines a divergence of the WI-FI AP signal graph based on the estimated WI-FI AP location is specifically: calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

In an example, the receiver is further configured to obtain a plurality of WI-FI AP signal strength values of each reference point in the positioning area; and the processor is further configured to: calculate a variance of the plurality of values, and when the variance is less than a variance threshold, perform the step of determining a signal graph of each of a plurality of Wireless Fidelity access points WI-FI APs in a positioning area.

In an example, the processor is further configured to: when the divergence is greater than an outdoor divergence threshold, determine that the WI-FI AP is a mobile WI-FI AP.

According to a sixth aspect, an embodiment of the present invention provides a positioning server. The positioning server includes a receiver and a processor. The receiver is configured to receive broadcast frames from a plurality of Wireless Fidelity access points WI-FI APs in a positioning area. The processor is configured to: determine a signal graph of each WI-FI AP based on the broadcast frames corresponding to the WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; and determine, based on the divergence of the WI-FI AP signal graph, whether the WI-FI AP is a mobile WI-FI AP.

In an example, the processor is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor is further configured to determine, based on the plurality of separately estimated WI-FI AP locations corresponding to the plurality of signal strength change intervals, a plurality of divergences respectively corresponding to the plurality of signal strength change intervals.

In an example, the processor is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor is further configured to calculate $$L^* = \sum_{i=1}^{N} w_i L_i$$

based on the WI-FI AP signal graph, to obtain the WI-FI AP location, where L* is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the processor is further configured to: calculate an average value of Euclidean distances between the plurality of reference points in the WI-FI AP signal graph and the estimated WI-FI AP location, and determine the average value as the divergence of the WI-FI AP signal graph.

In an example, that the processor determines a divergence of the WI-FI AP signal graph based on the estimated WI-FI AP location is specifically: calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

In an example, the receiver is further configured to receive a plurality of WI-FI AP signal strength values of each reference point in the positioning area; and the processor is further configured to: calculate a variance of the plurality of values, and when the variance is less than a variance threshold, perform the step of determining a signal graph of each of a plurality of Wireless Fidelity access points WI-FI APs in a positioning area.

In an example, the processor is further configured to: when the divergence is greater than an outdoor divergence threshold, determine that the WI-FI AP is a mobile WI-FI AP.

According to a seventh aspect, an embodiment of the present invention provides a positioning server. The positioning server includes a receiver and a processor. The receiver is configured to receive broadcast frames from a plurality of Wireless Fidelity access points WI-FI APs. The processor is configured to: determine a signal graph of a corresponding WI-FI AP based on the broadcast frames of the plurality of WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; determine, based on the divergence of the WI-FI AP signal graph, whether the WI-FI AP is a mobile WI-FI AP; when the WI-FI AP is a mobile WI-FI AP, delete the mobile WI-FI AP from a fingerprint database; and match an obtained signal strength in a positioning area with a signal strength of each reference point in the fingerprint database, to determine a positioning result of an apparatus whose signal strength is obtained.

In an example, the processor is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor is further configured to determine, based on the plurality of separately estimated WI-FI AP locations corresponding to the plurality of signal strength change intervals, a plurality of divergences respectively corresponding to the plurality of signal strength change intervals.

In an example, the processor is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor is further configured to: calculate an average value of Euclidean distances between the plurality of reference points in the WI-FI AP signal graph and the estimated WI-FI AP location, and determine the average value as the divergence of the WI-FI AP signal graph.

In an example, the receiver is further configured to receive a plurality of WI-FI AP signal strength values of each reference point in the positioning area. The processor is further configured to: calculate a variance of the plurality of values, and when the variance is less than a variance threshold, perform the step of determining a signal graph of each of a plurality of Wireless Fidelity access points WI-FI APs in a positioning area.

In an example, the processor is further configured to: when the divergence is greater than an outdoor divergence threshold, determine that the WI-FI AP is a mobile WI-FI AP.

In an example, the processor is further configured to: calculate a Euclidean distance $$d_i = \frac{\sqrt{\sum_{j=1}^{M}(RSSI^j - RSS_i^j)^2}}{M}, i = 1, 2, \ldots, N,$$

where $RSSI^j$ is a signal strength of a $j^{th}$ WI-FI AP at an $I^{th}$ reference point in the positioning area, $RSS_i^j$ is a signal strength of the $j^{th}$ WI-FI AP at an $i^{th}$ reference point in the fingerprint database, N is a quantity of reference points in the fingerprint database, and M is a quantity of WI-FI APs in the fingerprint database; and obtain n shortest Euclidean distances from the Euclidean distance $d_i$ to obtain the positioning result L, where $$L = \sum_{i=1}^{N} w_i d_i, w_i = \frac{1/RSS_i}{\sum_{j=1}^{N} 1/RSS_j}, i = 1, 2, \ldots, N,$$

$RSS_i$ represents a signal strength of an $i^{th}$ reference point in the WI-FI AP signal graph, and $RSS_j$ represents a signal strength of a $j^{th}$ reference point in the WI-FI AP signal graph.

In the embodiments of the present invention, the WI-FI AP location is estimated based on the WI-FI AP signal graph, so as to determine the divergence of the WI-FI AP signal graph, and determine, based on the divergence of the WI-FI AP signal graph, whether the corresponding WI-FI AP is a mobile AP. In the embodiments of the present invention, the mobile AP in the WI-FI fingerprint database can be identified. Fingerprint data of the mobile AP is destructive to WI-FI fingerprint positioning. Therefore, in the embodiments of the present invention, the mobile AP is deleted from the WI-FI fingerprint database, so that quality of the WI-FI fingerprint database is improved to improve WI-FI fingerprint positioning accuracy, and a data volume of the WI-FI fingerprint database is reduced to reduce computational complexity.

These aspects and other aspects of the present invention are simpler and easier to understand in descriptions of the following (a plurality of) embodiments.

DETAILED DESCRIPTION OF ILLUSTRATIVE EMBODIMENTS

Figure 1A:
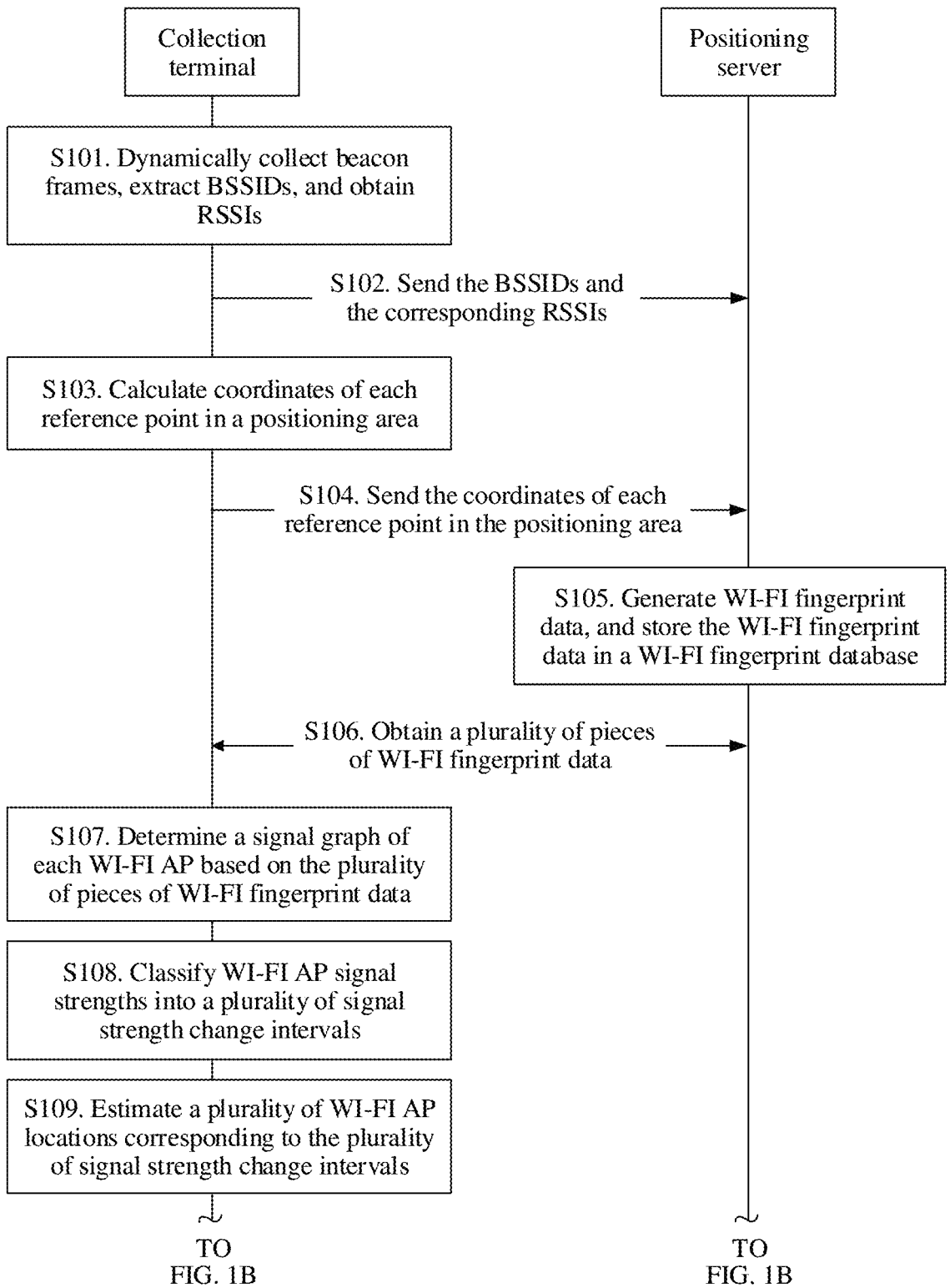
FIG. 1A and FIG. 1B are a schematic diagram of a WI-FI fingerprint positioning method based on a manner of dynamically creating a database indoors according to an embodiment of the present invention.

The following describes the embodiments of the present invention with reference to the accompanying drawings.

In WI-FI fingerprint positioning, quality of a fingerprint database directly affects positioning accuracy. Currently, in a fingerprint database creation process, a collected WI-FI AP signal is not screened. This means that not all collected WI-FI AP signals are from an AP that contributes to positioning. With an increase of mobile APs such as WI-FI hotspot devices and mobile in-vehicle infotainment systems, a signal of a mobile AP is inevitably collected in a fingerprint data collection process, and the signal of the mobile AP is destructive to a positioning result.

WI-FI APs whose fingerprint data may be collected are mainly classified into three types (shown in Table 1): a fixed WI-FI AP in a positioning area, a fixed WI-FI AP outside the positioning area, and a mobile WI-FI AP.

TABLE 1

| Type | Signal feature | Effect |
| --- | --- | --- |
| Fixed Wi-Fi AP in a positioning area | A large quantity of reference points are covered, a signal strength span is large, and a signal spatial transmission attenuation model can be met. | The fixed Wi-Fi AP in the positioning area has a positive effect on positioning accuracy, and more fixed Wi-Fi APs lead to higher positioning accuracy. |
| Fixed Wi-Fi AP outside the positioning area | A small quantity of reference points are covered, or a signal strength is relatively low (<−80 dBm). | The fixed Wi-Fi AP outside the positioning area does not have a positive effect on the positioning accuracy and does not affect the positioning accuracy, and fingerprint data of the fixed Wi-Fi AP outside the positioning area is redundant information. |
| Mobile Wi-Fi AP | Signal strengths are distributed irregularly, and a signal spatial transmission attenuation model is not met. | The mobile Wi-Fi AP is destructive to the positioning accuracy. |

It can be learned from Table 1 that the mobile WI-FI AP is destructive to the positioning accuracy in the WI-FI fingerprint positioning. However, in the prior art, in a location fingerprint database creation process, an AP is usually not identified, and whether a WI-FI AP is a mobile WI-FI AP cannot be determined. Consequently, a location fingerprint database includes fingerprint data of a mobile AP, severely affecting positioning accuracy. The following describes in detail, by using a plurality of embodiments, how to determine whether a WI-FI AP is a mobile WI-FI AP, and how to position the WI-FI AP after it is determined that the WI-FI AP is a mobile WI-FI AP in the present invention.

Embodiment 1

Embodiment 1 of the present invention relates to a manner of dynamically creating a database in an indoor positioning scenario. The dynamically creating a database is as follows: In a WI-FI fingerprint database creation process, a collector walks along a specified route at a uniform velocity with a collection terminal in hand, and the collection terminal collects and receives a signal from each WI-FI AP in an indoor positioning area as the collector walks, to obtain a piece of fingerprint data, and create a WI-FI fingerprint database of the positioning area. For the manner of dynamically creating a database, there is only one piece of fingerprint data for one reference point.

Figure 1B:
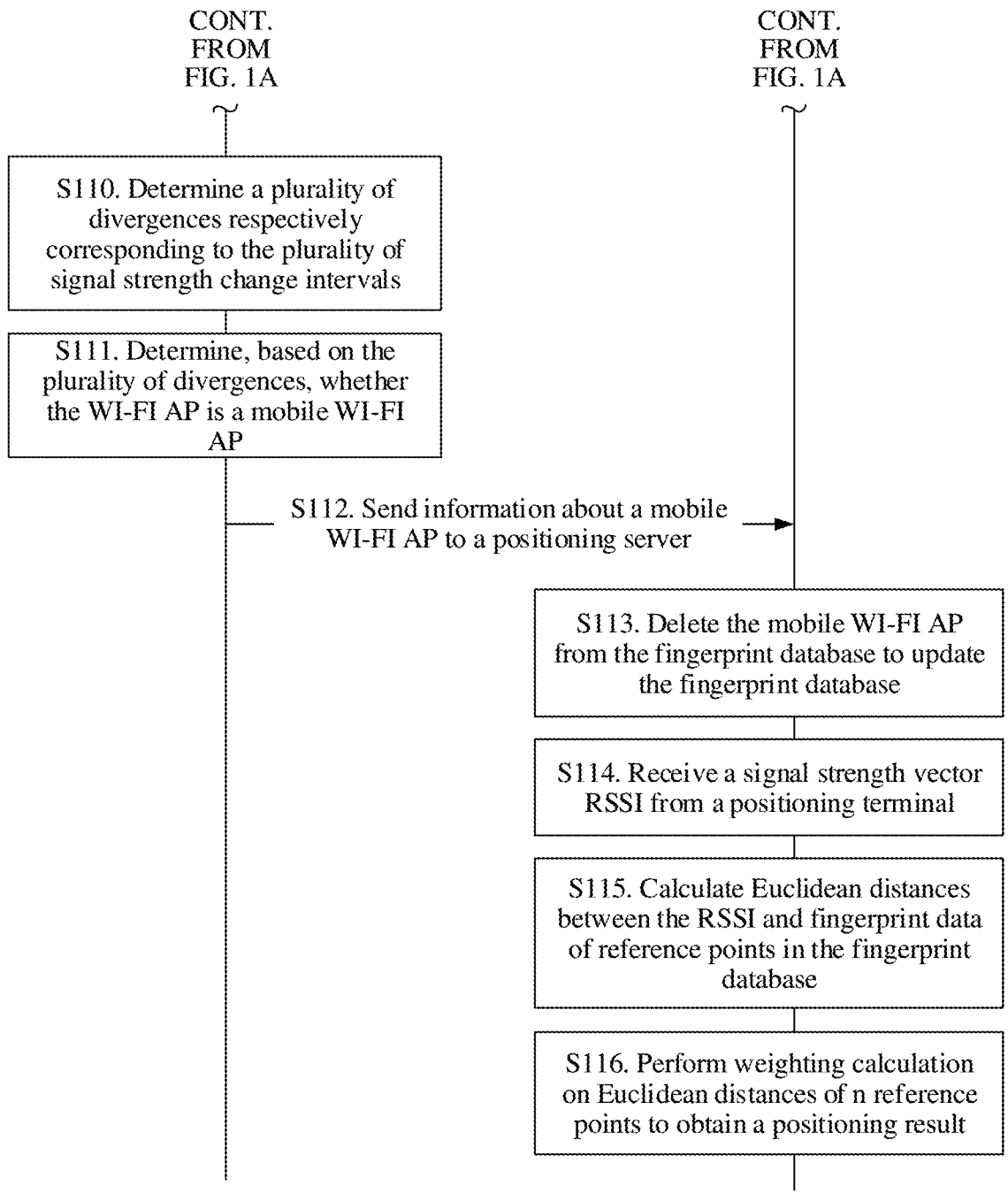

FIG. 1A and FIG. 1B are a schematic diagram of a WI-FI fingerprint positioning method based on the manner of dynamically creating a database indoors according to this embodiment of the present invention.

It should be noted that step 101 to step 105 are a process of creating an initial WI-FI fingerprint database, namely, a WI-FI fingerprint database creation process, and the created initial WI-FI fingerprint database includes fingerprint data of a fixed WI-FI AP and a mobile WI-FI AP. However, in the WI-FI fingerprint positioning method based on the manner of dynamically creating a database indoors provided in this embodiment of the present invention, a manner of creating an initial fingerprint database is not limited to step 101 to step 105, and step 101 to step 105 are merely an example of the fingerprint database creation method.

Step 101: The collection terminal collects a plurality of beacon frames respectively transmitted by a plurality of WI-FI APs in an indoor positioning area, extracts a BSSID (Basic Service Set Identifier) in each beacon frame, and also obtains a plurality of signal strengths corresponding to BSSIDs (details are described below). The BSSID is a MAC (Media Access Control) address of a WI-FI AP, and the WI-FI AP may be uniquely represented by the MAC address. Therefore, a BSSID can uniquely determine a WI-FI AP.

It should be noted herein that the WI-FI AP in this specification is not a same concept as an actual physical entity such as a wireless router or a wireless hotspot device. A physical entity device with a wireless access function is usually equipped with one or more wireless network adapters, or a plurality of virtual wireless network adapters are virtualized on one physical wireless network adapter. Each wireless network adapter or each virtual wireless network adapter is represented by a unique BSSID, namely, a MAC address. In other words, one physical entity device (such as a wireless router or a WI-FI hotspot) with a wireless access function includes one or more WI-FI APs, and each WI-FI AP may be uniquely represented by a MAC address of the WI-FI AP.

Specifically, according to a WI-FI bottom-layer standard protocol, a WI-FI AP broadcasts a beacon frame periodically, for example, every second or every 500 ms. A collector walks along a fixed collection route at a uniform velocity with the collection terminal in hand. A WI-FI AP transmits a signal at an interval of a fixed time, and the collection terminal collects a signal at an interval of a fixed time (for example, 1s). A location at which a signal is collected each time is a reference point. At an $i^{th}$ reference point, the collection terminal can collect signal strengths RSSIs respectively corresponding to the plurality of WI-FI APs. For example, at the $i^{th}$ reference point, a strength of a signal transmitted by a WI-FI AP 1 (corresponding to a BSSID 1) is an RSS 1, a strength of a signal transmitted by a WI-FI AP 2 (corresponding to a BSSID 2) is an RSS 2, . . . , and a strength of a signal transmitted by a WI-FI AP N (corresponding to a BSSID N) is an RSS N. A list of BBSIDs and signal strengths RSSIs corresponding to the BBSIDs is formed. The signal strengths RSSIs collected by the collection terminal at the $i^{th}$ reference point are shown in the following Table 2.

TABLE 2

| BSSID 1 | RSS 1 |
|---|---|
| BSSID 2 | RSS 2 |
| BSSID 3 | RSS 3 |
| . | . |
| . | . |
| . | . |
| BSSID N | RSS N |

Step 102: The collection terminal sends, to a positioning server, BSSIDs of each reference point in the positioning area and corresponding signal strengths RSSIs that are collected by the collection terminal.

It should be noted that step 103 may be performed before step 102.

Step 103: The collection terminal obtains coordinates of each reference point in the positioning area based on a quantity of reference points, and start point coordinates and end point coordinates that are collected by the collection terminal in the positioning area.

Specifically, the collector walks along the fixed collection route at a uniform velocity with the collection terminal in hand. A WI-FI AP transmits a signal at an interval of a fixed time, for example, transmits a signal every second, and therefore the collection terminal collects a signal at an interval of a fixed time (for example, 1s). A location at which a signal is collected each time is a reference point, and reference points are evenly distributed on the collection route. Therefore, the quantity of reference points can be determined based on a quantity of times of collecting a signal. It is assumed that there are N reference points, the start point coordinates of the collection route are (x1, y1), and the end point coordinates of the collection route are (x2, y2). In this case, location coordinates of a reference point i (i=1, 2, . . . , or N) are $xi=x1+(x2-x1)*(i-1)/(N-1)$ and $yi=y1+(y2-y1)*(i-1)/(N-1)$.

Step 104: The collection terminal sends the calculated coordinates of each reference point to the positioning server.

Step 105: The positioning server generates a plurality of pieces of WI-FI fingerprint data based on the BSSIDs and the corresponding signal strengths RSSIs of each reference point in the positioning area, and the corresponding coordinates of each reference point that are received by the positioning server, and stores the generated WI-FI fingerprint data in a location fingerprint database.

The following describes in detail the WI-FI fingerprint database generated by the positioning server.

The WI-FI fingerprint database includes a plurality of pieces of WI-FI fingerprint data, and each piece of WI-FI fingerprint data is corresponding to a plurality of reference points in a positioning area. Each piece of fingerprint data includes two parts: location coordinates of the corresponding reference points and WI-FI AP signal strengths, as shown in the following Table 3.

TABLE 3

| $L_1$ | $RSS_1 = (RSS_1^1, RSS_1^2, \ldots, RSS_1^M)$ |
|---|---|
| $L_2$ | $RSS_2 = (RSS_2^1, RSS_2^2, \ldots, RSS_2^M)$ |
| $L_3$ | $RSS_3 = (RSS_3^1, RSS_3^2, \ldots, RSS_3^M)$ |
| . | . |
| . | . |
| . | . |
| $L_N$ | $RSS_N = (RSS_N^1, RSS_N^2, \ldots, RSS_N^M)$ |

In Table 3, the WI-FI fingerprint database includes N pieces of WI-FI fingerprint data, and $L_i$ (i=1, 2, . . . , or N) is location coordinates of a reference point corresponding to an $i^{th}$ piece of WI-FI fingerprint data. Values of the location coordinates are determined by a specific positioning environment. For example, if the positioning area is an indoor site such as a supermarket, an office building, or a garage, the location coordinates are usually represented as coordinates in a preset two-dimensional plane coordinate system, and are usually measured in meters. If the positioning area is an outdoor scenario, the location coordinates are usually represented as longitude and latitude of the reference point. In Table 3, $RSS_i$ (i=1, 2, . . . , or N) represents signal strengths of first to $M^{th}$ WI-FI APs at an $i^{th}$ reference point, and is referred to as a signal strength vector of the $i^{th}$ reference point herein. A signal strength is measured in dBm, and a signal strength value is negative. For each reference point, possibly signals transmitted by all WI-FI APs at the reference point cannot be received, and for a WI-FI AP whose signal is not received, a signal strength value of the WI-FI AP is represented as 0.

Step 106: The collection terminal sends a request to the positioning server to obtain WI-FI AP fingerprint data of a plurality of reference points in the positioning area, where the WI-FI AP fingerprint data is stored in the positioning database of the positioning server.

Step 107: The collection terminal receives a plurality of pieces of WI-FI AP fingerprint data in the positioning area, and determines a signal graph of each WI-FI AP based on the plurality of pieces of WI-FI AP fingerprint data. The WI-FI AP signal graph includes coordinates of a plurality of reference points and a WI-FI AP signal strength corresponding to coordinates of each reference point.

In the location fingerprint database, each location fingerprint includes location coordinates of a reference point and a signal strength vector RSSI, as shown in Table 3. For each WI-FI AP, signal strength vectors RSSIs of the WI-FI AP and coordinates of corresponding reference points are extracted from the location fingerprint to obtain a WI-FI AP signal graph. In other words, for a WI-FI AP, a WI-FI AP signal graph includes coordinates of a plurality of reference points and WI-FI AP signal strengths corresponding to the coordinates of the reference points. Step 107 is extracting the signal graph of each WI-FI AP from the location fingerprint database.

Step 108: The collection terminal classifies WI-FI AP signal strengths into a plurality of signal strength change intervals based on a signal strength change range in the WI-FI AP signal graph.

Through a field test, an RSSI change range of a fixed WI-FI AP in the positioning area is −40 to −100 dBm. Generally, an RSSI change of one fixed WI-FI AP at one location does not exceed 10 dBm. Therefore, an RSSI interval may be set by using 10 dBm as a step. For example, when an RSSI change range of a WI-FI AP in the positioning area is −52 to −98 dBm, signal strength change intervals are separately classified into [−50, −60], [−60, −70], [−70, −80], [−80, −90], and [−90, −100].

Step 109: The collection terminal separately estimates, based on coordinates of reference points corresponding to the plurality of signal strength change intervals in the WI-FI AP signal graph, a plurality of WI-FI AP locations corresponding to the plurality of signal strength change intervals.

In an example, coordinates of each reference point corresponding to the WI-FI AP are obtained based on the WI-FI AP signal graph, and the WI-FI AP location is estimated by using a weighting algorithm. A weight of the weighting algorithm is determined by a signal strength of a corresponding reference point.

Specifically, a formula for calculating the weighted average location is as follows:

$$L^* = \sum_{i=1}^{N} w_i L_i, \quad (1)$$

where $L^*$ is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

and $RSS_i$ represents a signal strength of the $i^{th}$ reference point in the WI-FI AP signal graph.

In other words, the plurality of estimated WI-FI AP locations corresponding to the plurality of signal strength change intervals are a plurality of WI-FI AP weighted average locations, and the weighted average location is weighted average coordinates obtained after a weighted value is assigned to coordinates of each reference point.

FIG. 2 is schematic diagrams of WI-FI AP weighted average locations respectively corresponding to signal strength change intervals according to this embodiment of the present invention. FIG. 2A is a schematic diagram of a WI-FI AP weighted average location when a signal strength falls within [−60, −70]. FIG. 2B is a schematic diagram of a WI-FI AP weighted average location when a signal strength falls within [−70, −80]. FIG. 2C is a schematic diagram of a WI-FI AP weighted average location when a signal strength falls within [−80, −90]. FIG. 2D is a schematic diagram of a WI-FI AP weighted average location when a signal strength falls within [−90, −100].

In FIG. 2, a horizontal coordinate and a vertical coordinate are measured in meters, and the horizontal coordinate and the vertical coordinate illustrate a location of each reference point. For example, a horizontal axis represents an east-west direction, and a vertical axis represents a south-north direction. In FIG. 2, a hollow circle indicates horizontal and vertical coordinates of each reference point, and an asterisk indicates a WI-FI AP weighted average location in a corresponding signal strength change interval, namely, an estimated WI-FI AP location.

Figure 2A:
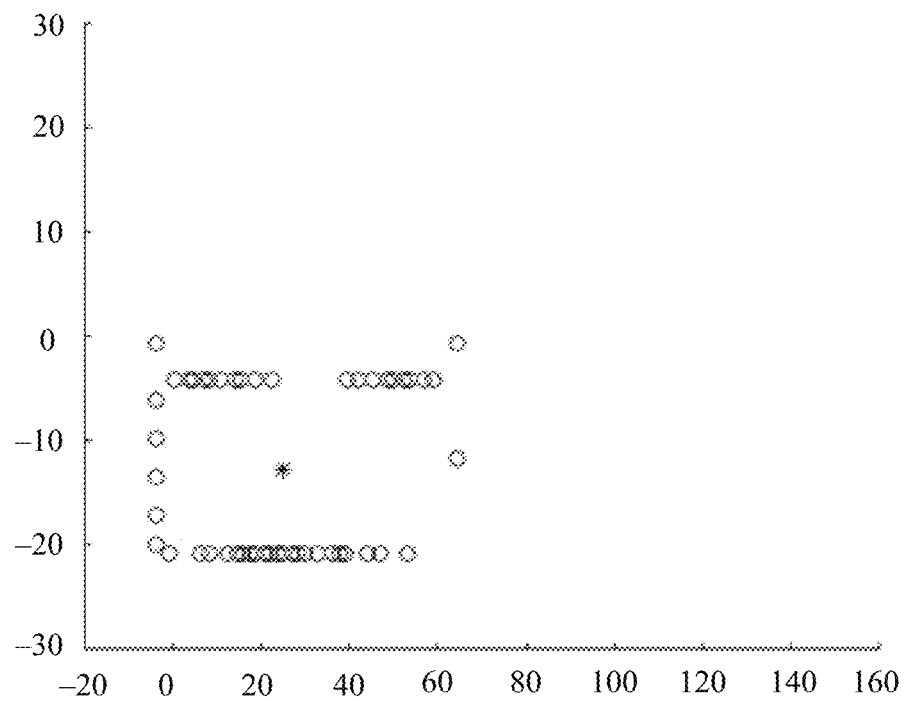
FIG. 2A is a schematic diagram of a WI-FI AP weighted average location when a signal strength falls within [−60, −70] according to an embodiment of the present invention.
Figure 2B:
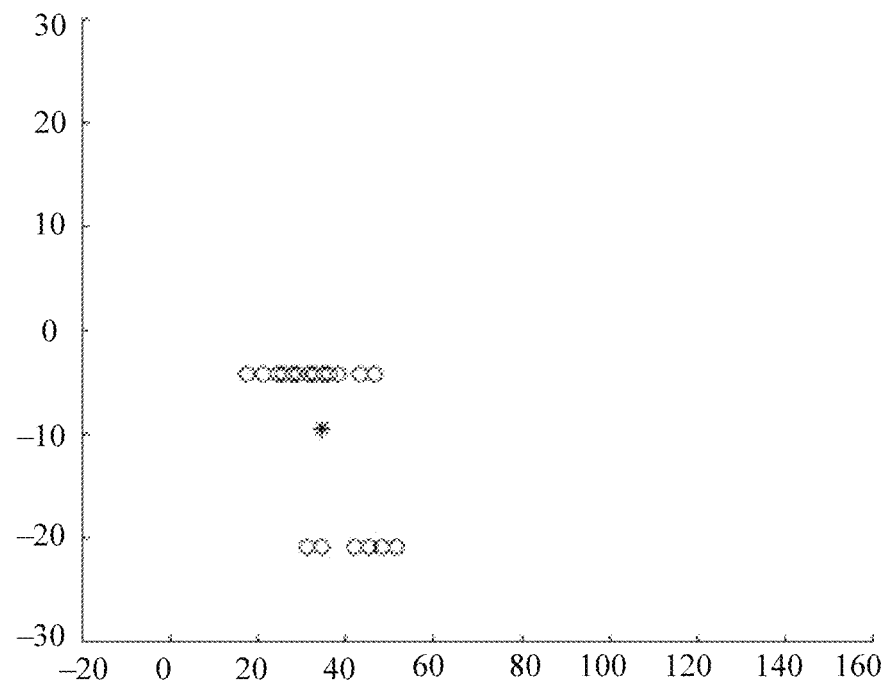
FIG. 2B is a schematic diagram of a WI-FI AP weighted average location when a signal strength falls within [−70, −80] according to an embodiment of the present invention.
Figure 2C:
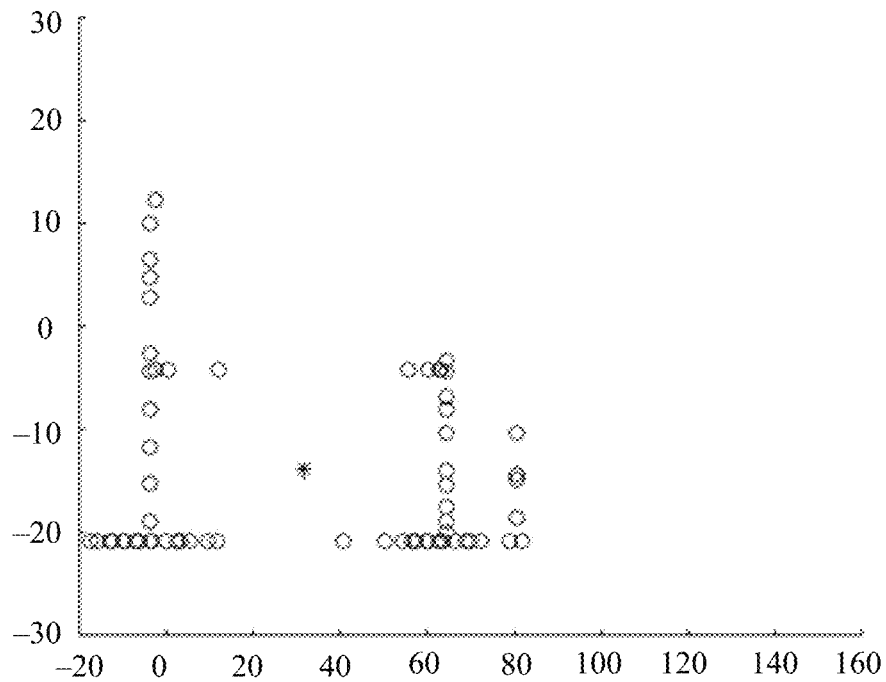
FIG. 2C is a schematic diagram of a WI-FI AP weighted average location when a signal strength falls within [−80, −90] according to an embodiment of the present invention.
Figure 2D:
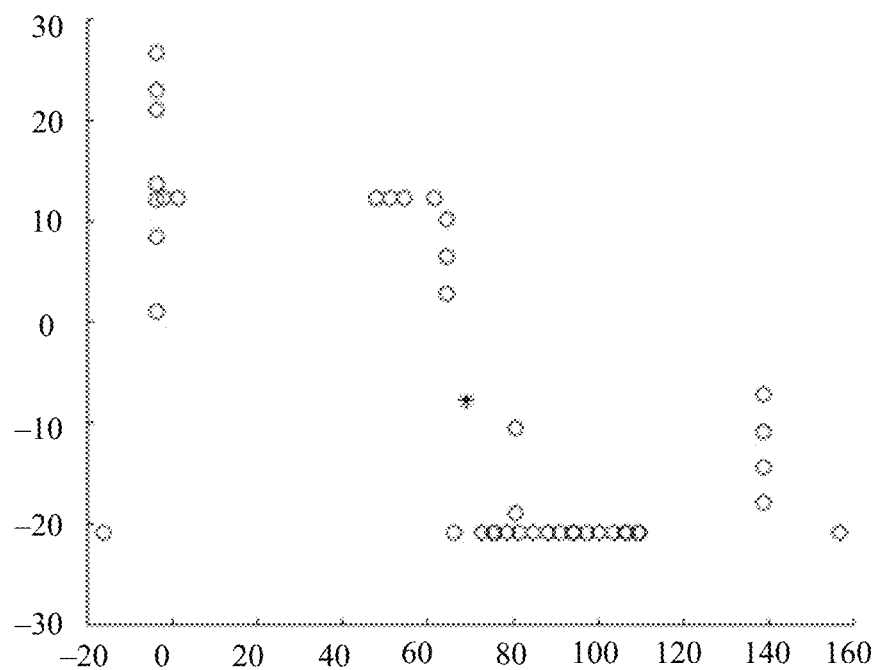
FIG. 2D is a schematic diagram of a WI-FI AP weighted average location when a signal strength falls within [−90, −100] according to an embodiment of the present invention.

It can be learned from FIG. 2 that, for a fixed WI-FI AP, as shown in FIG. 2A, larger endpoint values of a signal strength change interval indicate more convergent distribution of reference points in space and a shorter distance between a WI-FI AP weighted average location and a location of each reference point. On the contrary, as shown in FIG. 2D, smaller endpoint values of a signal strength change interval indicate more divergent distribution of reference points in space and a longer distance between a WI-FI AP weighted average location and a location of each reference point.

Step 110: The collection terminal determines, based on the plurality of separately estimated WI-FI AP locations corresponding to the plurality of signal strength change intervals, a plurality of divergences respectively corresponding to the plurality of signal strength change intervals.

A divergence of the WI-FI AP signal graph is a divergence degree between the reference points in the WI-FI AP signal graph and the estimated WI-FI AP location, and may be determined by using an average value of Euclidean distances between the reference points in the WI-FI AP signal graph and the WI-FI AP weighted average location. Details are described below.

In an example, an average value of Euclidean distances between the plurality of reference points in the WI-FI AP signal graph and the estimated WI-FI AP location is calculated, and the average value is determined as the divergence of the WI-FI AP signal graph.

Specifically, a formula for calculating the divergence of the WI-FI AP signal graph is as follows:

$$div_j = \frac{\sum_{i=1}^{N_j} \sqrt{(L_i(x) - L^*(x))^2 + (L_i(y) - L^*(y))^2}}{N_j}, \quad (2)$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

Step 111: The collection terminal determines, based on a divergence of the WI-FI AP signal graph, whether the WI-FI AP is a mobile WI-FI AP.

In an example, if smaller endpoint values of a signal strength change interval obtained through division based on the WI-FI AP signal graph indicate a larger divergence corresponding to the signal strength change interval, or if larger endpoint values of a signal strength change interval obtained through division based on the WI-FI AP signal graph indicate a smaller divergence corresponding to the signal strength change interval, it is determined that the WI-FI AP is a mobile WI-FI AP. Details are described below.

Embodiment 1 describes a manner of dynamically creating a database in an indoor positioning scenario, and the indoor positioning scenario includes a supermarket, a garage, an office building, a station, and the like. In these indoor positioning areas, a plurality of fixed WI-FI APs are usually deployed, and a mobile WI-FI AP occasionally exists. The mobile WI-FI AP is usually a WI-FI hotspot of a mobile terminal, a WI-FI hotspot in an in-vehicle infotainment system, or the like. An indoor environment may be idealized into a free space. In this free space, a signal transmitted by a WI-FI AP deployed in the space may cover most of the free space, and a signal receive power usually can meet an exponential attenuation relationship. Therefore, for the indoor environment, a fingerprint of the fixed WI-FI AP in a location fingerprint database covers a large quantity of reference points, and a signal strength change range has a large span. For example, the signal strength change range is [−52, −98] dBm.

The fixed WI-FI AP in the positioning area is deployed at a fixed location, and generally meets an electromagnetic wave transmission model in the free space. In other words, there is an exponential attenuation relationship between a signal receive power and a distance.

A location of the mobile WI-FI AP is not fixed in one or more collection and creation processes of a location fingerprint database. Therefore, in the location fingerprint database, signal strengths of the mobile WI-FI AP are distributed irregularly, the electromagnetic wave exponential attenuation model in the free space is not met, and the signal strengths are distributed in disorder in space.

Figure 3A:
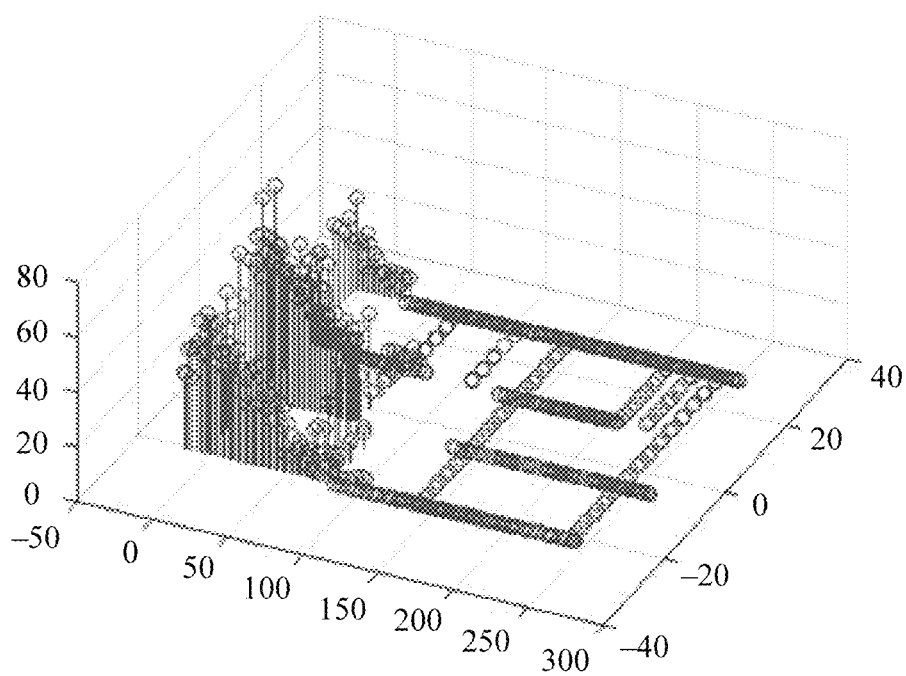
FIG. 3A is a schematic diagram of signal strength distribution of a fixed WI-FI AP according to an embodiment of the present invention.
Figure 3B:
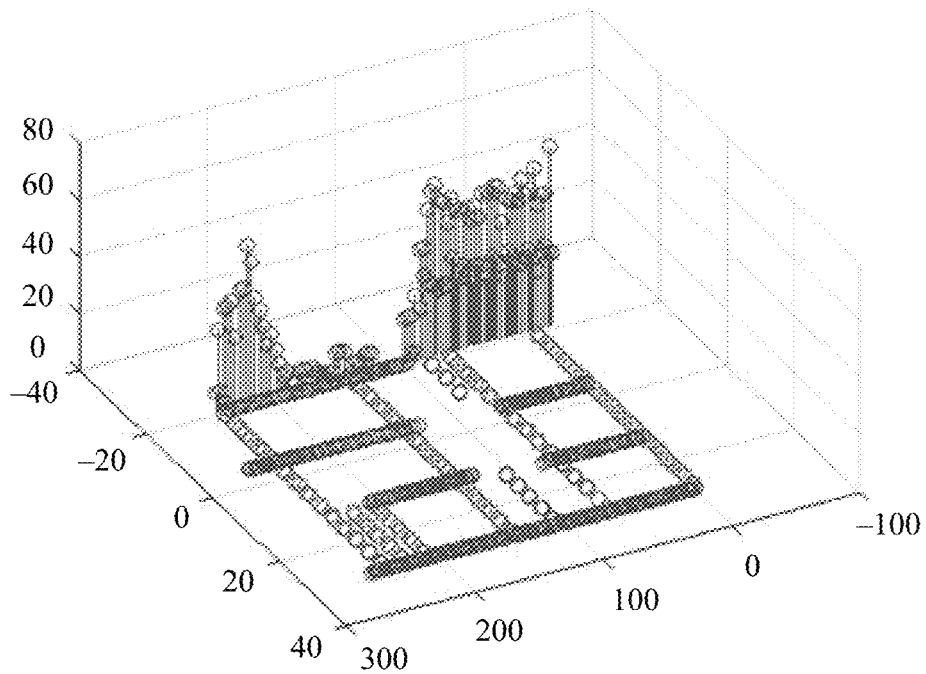
FIG. 3B is a schematic diagram of signal strength distribution of a mobile WI-FI AP according to an embodiment of the present invention.

FIG. 3 is schematic diagrams of signal strength distribution of a fixed WI-FI AP and a mobile WI-FI AP according to this embodiment of the present invention. FIG. 3A is a schematic diagram of signal strength distribution of the fixed WI-FI AP, and FIG. 3B is a schematic diagram of signal strength distribution of the mobile WI-FI AP.

In FIG. 3A, an x-coordinate and a y-coordinate are measured in meters, and a z-coordinate is measured in dBm. The x-coordinate and the y-coordinate represent spatial directions of a two-dimensional plane. For example, an x-axis represents an east-west direction, and a y-axis represents a south-north direction. In FIG. 3B, an x-coordinate and a y-coordinate are measured in meters, and a z-coordinate is measured in dBm. The x-coordinate and the y-coordinate represent spatial directions of a two-dimensional plane. For example, an x-axis represents an east-west direction, and a y-axis represents a south-north direction.

It can be learned from FIG. 3 that, for the fixed WI-FI AP, the signal strength distribution is continuous in the positioning area, an envelope curve of the signal strength distribution is like a hillside, and a peak (a maximum signal strength value) is a deployment location of the WI-FI AP. The signal strength distribution of the fixed WI-FI AP has the following features.

(1) There is only one peak.

(2) A larger signal strength indicates shorter distances from reference point locations to the peak and a smaller divergence of reference points.

(3) A smaller signal strength indicates longer distances from reference point locations to the peak and a larger divergence of reference points.

For the mobile WI-FI AP, a location of the mobile WI-FI AP constantly changes in a database creation and scanning process, and therefore the signal strength distribution of the mobile WI-FI AP in the whole positioning area has the following features:

(1) There may be a plurality of peaks.

(2) A signal strength changes irregularly, and a breakpoint or an area in which a signal strength drastically changes exists.

Therefore, for the fixed WI-FI AP, regardless of the indoor environment, the following features are met: A larger signal strength indicates more convergent reference point locations in a WI-FI AP signal graph, and a smaller signal strength indicates more divergent reference point locations in a WI-FI AP signal graph. In other words, larger endpoint values of a signal strength interval are corresponding to a smaller divergence. However, for the mobile WI-FI AP, the foregoing features are not met. In other words, divergences of different signal strength intervals are irregular.

Figure 4A:
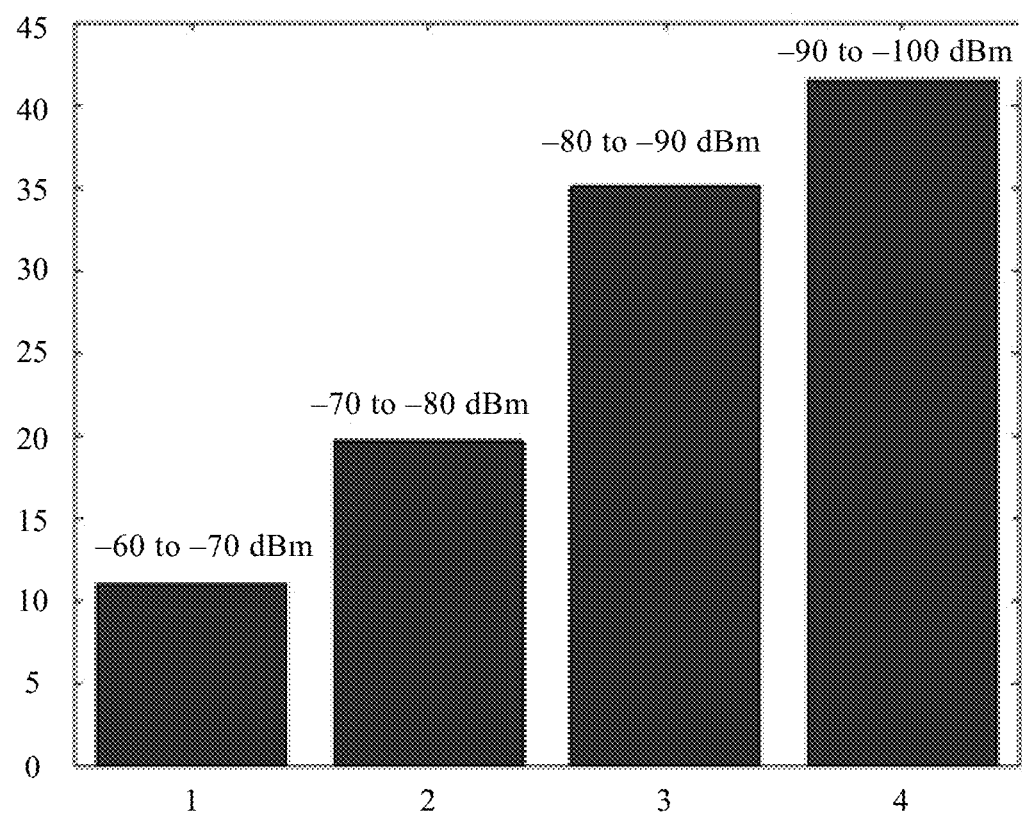
FIG. 4A is a schematic diagram of a relationship between a signal strength interval of a fixed WI-FI AP and a divergence of the fixed WI-FI AP.
Figure 4B:
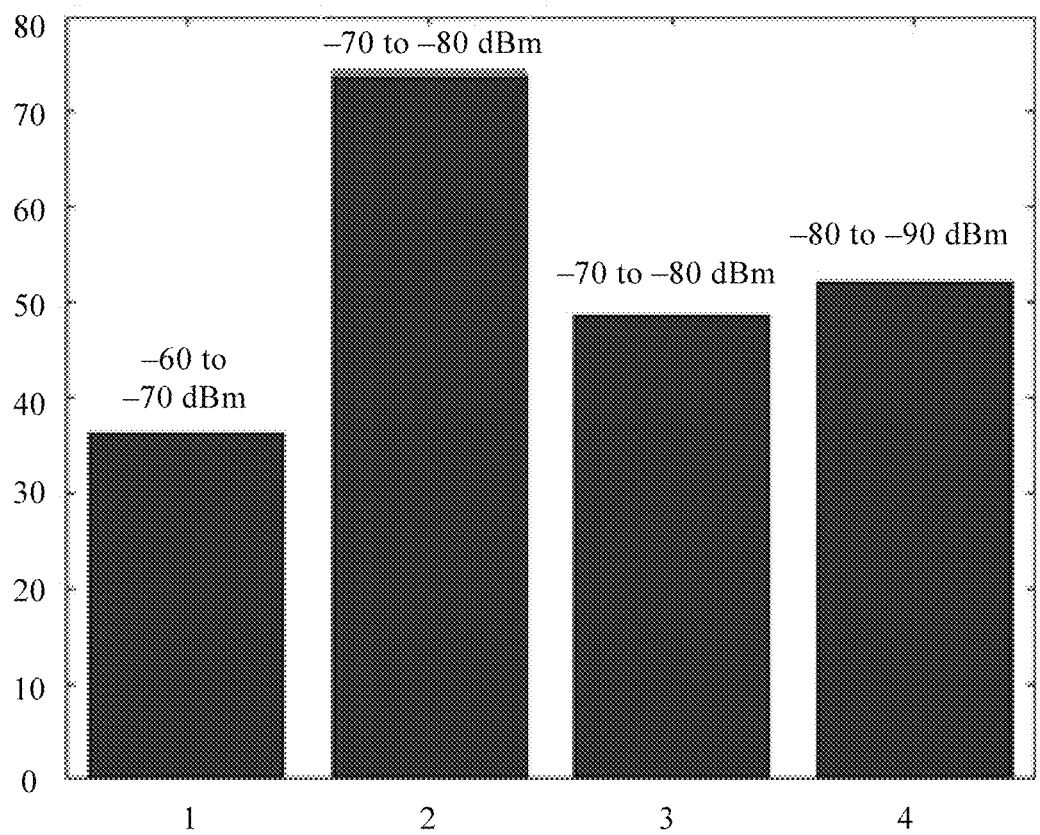
FIG. 4B is a schematic diagram of a relationship between a signal strength interval of a mobile WI-FI AP and a divergence of the mobile WI-FI AP.

Referring to FIG. 4, FIG. 4 is schematic diagrams of relationships between a signal strength interval of a WI-FI AP and a divergence of the WI-FI AP according to this embodiment of the present invention. FIG. 4A is a schematic diagram of a relationship between a signal strength interval of a fixed WI-FI AP and a divergence of the fixed WI-FI AP. FIG. 4B is a schematic diagram of a relationship between a signal strength interval of a mobile WI-FI AP and a divergence of the mobile WI-FI AP. In FIG. 4, a horizontal coordinate represents a signal strength change interval, and a vertical coordinate represents a divergence of a WI-FI AP.

It can be learned from FIG. 4 that for the fixed WI-FI AP, as endpoint values of the signal strength interval decrease, the divergence gradually increases, and reference points in a WI-FI AP signal graph are distributed more divergently in space; and as endpoint values of the signal strength interval increase, the divergence gradually decreases, and reference points in a WI-FI AP signal graph are distributed more convergently in space. For the mobile WI-FI AP, there is no regulation between a change of the endpoint values of the signal strength interval and a divergence change. Therefore, the mobile WI-FI AP may be identified by using the foregoing feature.

In addition, for the fixed WI-FI AP, a coverage area of reference points in a signal graph at a current-level RSSI interval includes a coverage area at a previous-level RSSI interval. However, for the mobile WI-FI AP, there is no such regulation.

Figure 5A:
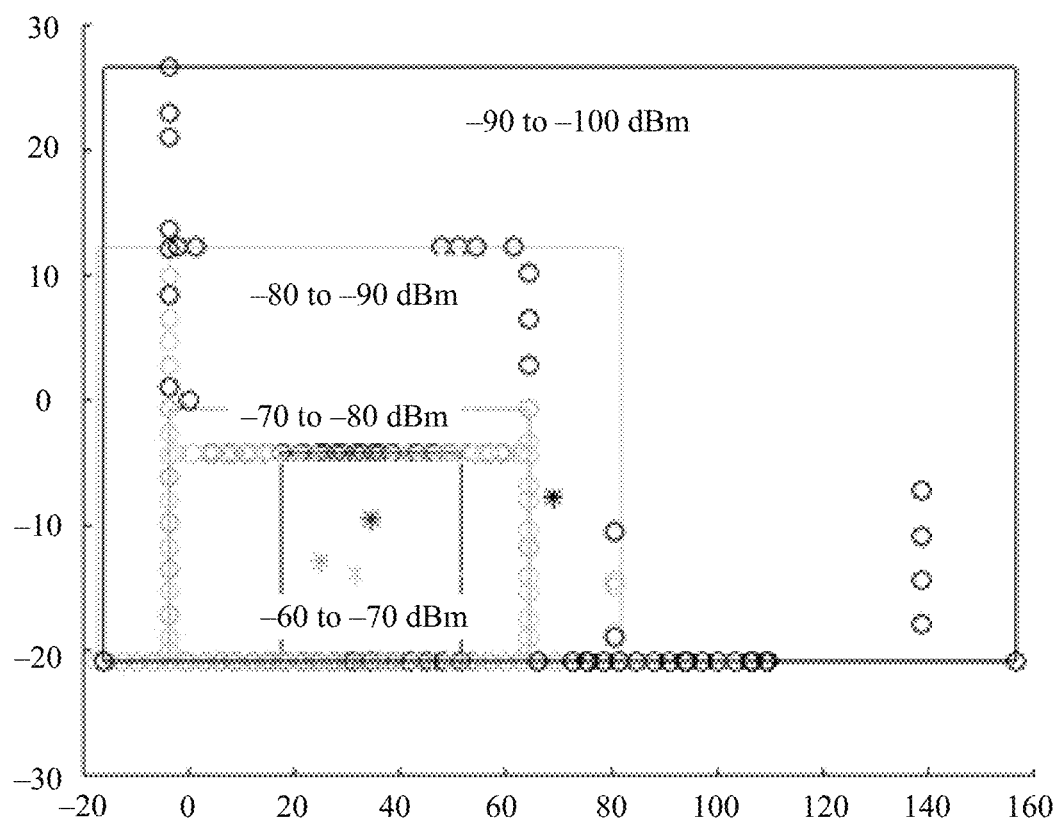
FIG. 5A is a schematic diagram of a relationship between a signal strength interval of a fixed WI-FI AP and a spatial location of the fixed WI-FI AP.
Figure 5B:
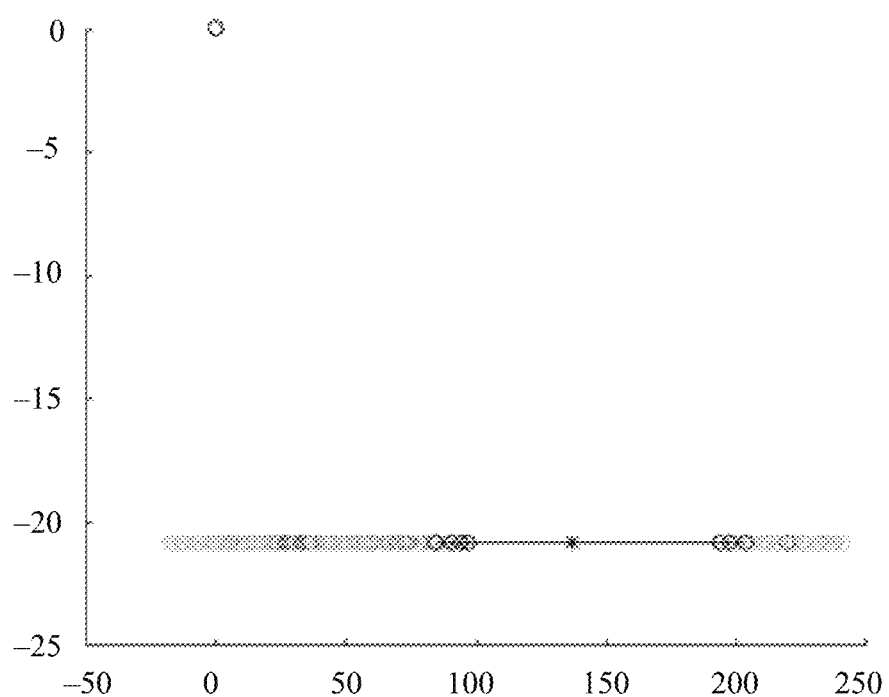
FIG. 5B is a schematic diagram of a relationship between a signal strength interval of a mobile WI-FI AP and a spatial location of the mobile WI-FI AP.

FIGS. 5(a) and 5(b) are schematic diagrams of relationships between a signal strength interval of a WI-FI AP and a spatial location of the WI-FI AP according to this embodiment of the present invention. FIG. 5A is a schematic diagram of a relationship between a signal strength interval of a fixed WI-FI AP and a spatial location of the fixed WI-FI AP. FIG. 5B is a schematic diagram of a relationship between a signal strength interval of a mobile WI-FI AP and a spatial location of the mobile WI-FI AP. In FIG. 5, a horizontal coordinate and a vertical coordinate represent spatial location coordinates of a reference point, and an asterisk represents a reference point.

In FIGS. 5(a) and 5(b), a horizontal coordinate and a vertical coordinate are measured in meters, and represent directions in two-dimensional space. For example, an x-axis represents an east-west direction, and a y-axis represents a south-north direction.

It can be learned from FIGS. 5(a) and 5(b) that, for the fixed WI-FI AP, a coverage area of a signal graph of a signal strength change interval [−90, −100] dBm includes a signal graph of a signal strength change interval [−80, −90] dBm, a coverage area of the signal graph of the signal strength change interval [−80, −90] dBm includes a signal graph of a signal strength change interval [−70, −80] dBm, and a coverage area of the signal graph of the signal strength change interval [−70, −80] dBm includes a signal graph of a signal strength change interval [−60, −70] dBm. However, for the mobile WI-FI AP, there is no such regulation.

It should be noted that step 106 to step 111 are described by using an example in which the mobile WI-FI AP is identified by the collection terminal, and actually, the mobile WI-FI AP may be identified by the positioning server. To be specific, the positioning server identifies a mobile WI-FI AP in an existing fingerprint database based on WI-FI AP fingerprint data in the fingerprint database. How the positioning server identifies the mobile WI-FI AP is the same as the method in which the collection terminal identifies the mobile WI-FI AP, and details are not described herein again.

In addition, steps 101 to 111 provide a method for dynamically creating a database indoors and determining a mobile WI-FI AP in the newly created fingerprint database. When the mobile WI-FI AP is determined, in this embodiment of the present invention, the fingerprint database may be further updated by deleting the mobile WI-FI AP from the fingerprint database, and a positioning function is implemented based on an updated fingerprint database. In other words, this embodiment of the present invention further provides a WI-FI AP-based positioning method, and the positioning method is implemented on the basis that the mobile WI-FI AP has been deleted from the fingerprint database. The following further describes how to implement the positioning function based on the updated fingerprint database in this embodiment of the present invention.

Step 112: The collection terminal sends, to the positioning server, information about a mobile WI-FI AP learned through screening by the collection terminal.

Step 113: The positioning server deletes the mobile WI-FI AP from the fingerprint database to update the fingerprint database.

In an example, the positioning server updates the fingerprint database periodically. For example, the positioning server deletes a mobile WI-FI AP from the fingerprint database every hour to update the fingerprint database.

Step 114: The positioning server receives a signal strength vector RSSI from a positioning terminal.

Specifically, the positioning terminal, for example, a mobile phone with a positioning function, receives a group of WI-FI AP signals at a location in the positioning area, and signal strengths are RSSIs ($RSSI^1$, $RSSI^2$, ..., and $RSSI^M$), where $RSSI^1$ is a signal strength of a first WI-FI AP, $RSSI^2$ is a signal strength of a second WI-FI AP, and $RSSI^M$ is a signal strength of an $M^{th}$ WI-FI AP.

Step 115: The positioning server calculates Euclidean distances between the signal strength vector RSSI and fingerprint data of reference points in the fingerprint database:

$$d_i = \frac{\sqrt{\sum_{j=1}^{M}(RSSI^j - RSS_i^j)^2}}{M}, i = 1, 2, \ldots, N \qquad (3)$$

In Formula (3), $d_i$ is a Euclidean distance, $RSSI^j$ is a signal strength of a $j^{th}$ WI-FI AP at an $I^{th}$ reference point in the positioning area, $RSS_i^j$ is a signal strength of the $j^{th}$ WI-FI AP at an $i^{th}$ reference point in the fingerprint database, N is a quantity of reference points in the fingerprint database, and M is a quantity of WI-FI APs in the fingerprint database. It can be learned from Formula (3) that a smaller Euclidean distance value indicates that a difference between a signal strength of the positioning terminal and a signal strength of a reference point is smaller and a location of the positioning terminal better matches a location of the reference point, in other words, the positioning terminal is closer to the reference point. On the contrary, the positioning terminal is more distant from the reference point.

Step 116: The positioning server arranges values of the calculated Euclidean distances in ascending order, and separately performs weighting calculation on horizontal and vertical coordinates of reference points corresponding to first n smallest values, to obtain a positioning result of the positioning terminal. The positioning result L is:

$$L = \sum_{i=1}^{n} w_i L_i^*, \qquad (4)$$

where $W_i$ is a weight corresponding to coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

and $RSS_i$ represents a signal strength of the $i^{th}$ reference point in the WI-FI AP signal graph.

The location of the positioning terminal can be determined based on the calculated positioning result L, thereby implementing accurate positioning of the positioning terminal.

Embodiment 1 of the present invention provides a mobile WI-FI AP determining method based on the manner of dynamically creating a database indoors, and a corresponding positioning method. In Embodiment 1 of the present invention, the mobile WI-FI AP is learned through screening, and the mobile WI-FI AP is deleted from the fingerprint database, so that a data fingerprint of the mobile WI-FI AP destructive to positioning accuracy is deleted. In this embodiment of the present invention, a user is positioned based on a fingerprint database that includes only a fixed WI-FI AP, thereby improving positioning accuracy.

Embodiment 2

Embodiment 2 of the present invention relates to a manner of creating a database at fixed points in an indoor positioning scenario. The creating a database at fixed points means drawing cross grids in advance in a positioning area, and collecting a WI-FI signal by using each grid intersection as a reference point, so as to create a WI-FI fingerprint database. For the manner of creating a database at fixed points, a plurality of pieces of fingerprint data is collected for a same reference point.

Figure 6A:
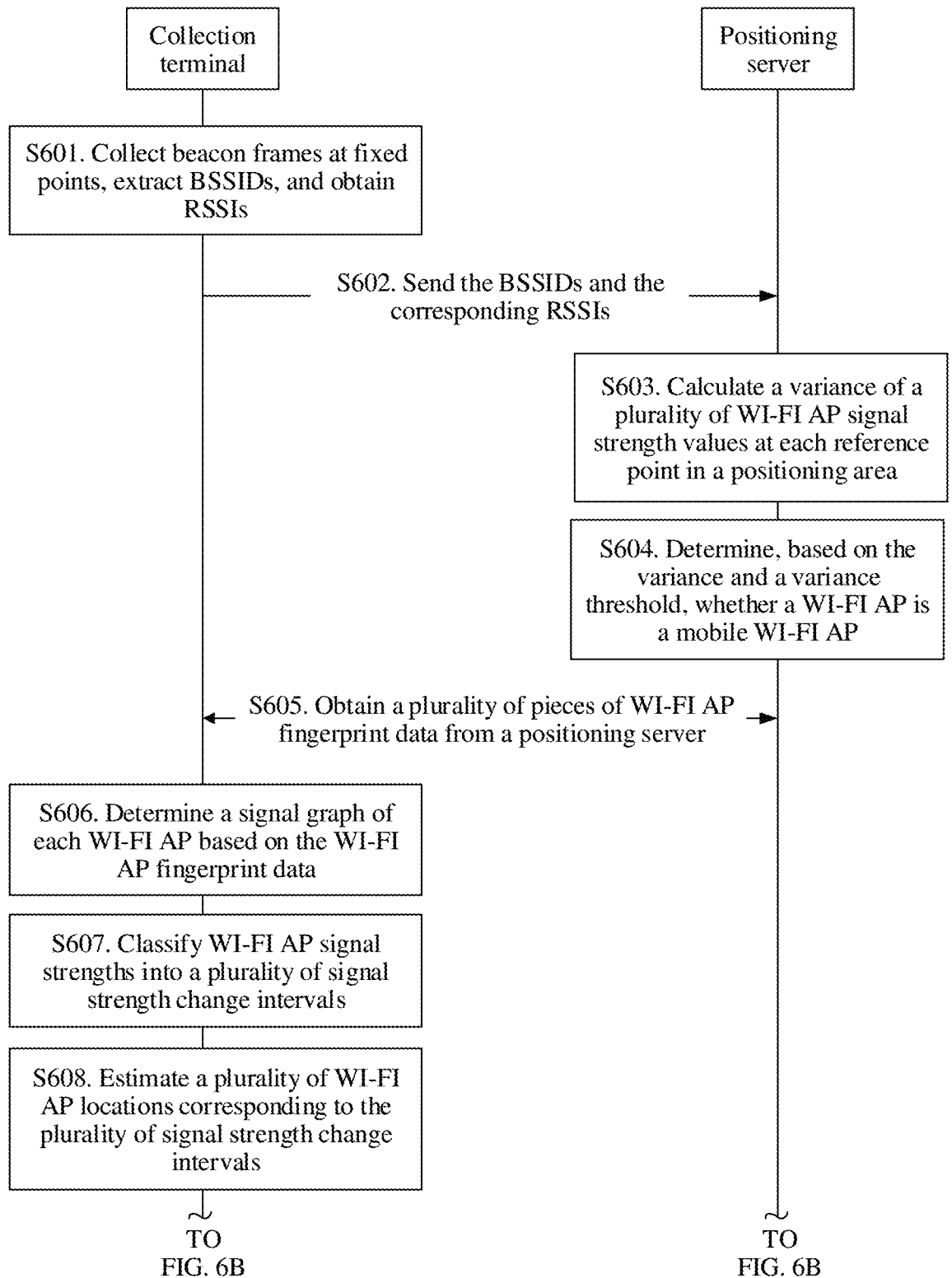
FIG. 6A and FIG. 6B are a schematic diagram of a WI-FI fingerprint positioning method based on a manner of creating a database at fixed points indoors according to an embodiment of the present invention.
Figure 6B:
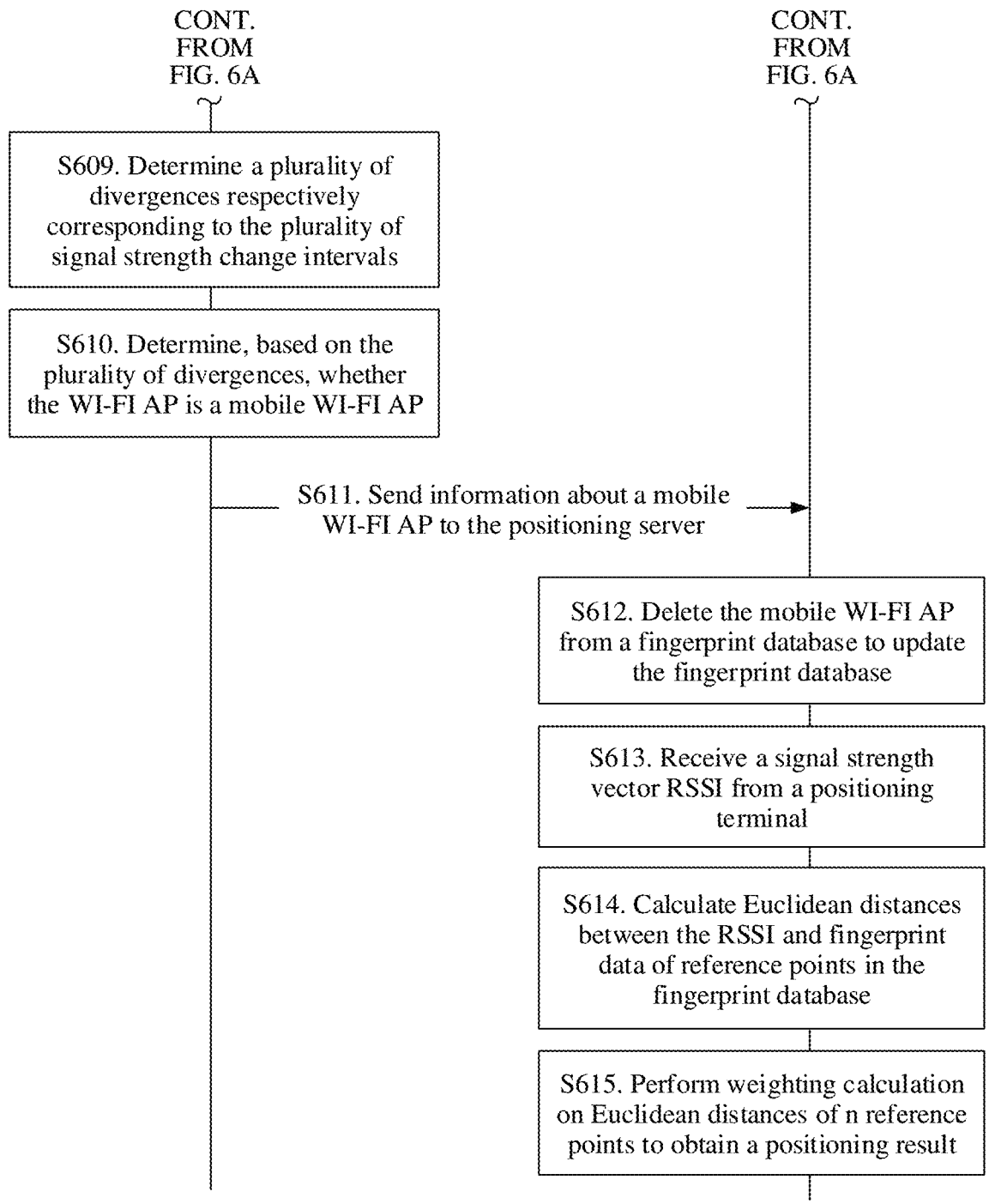

FIG. 6A and FIG. 6B are a schematic diagram of a WI-FI fingerprint positioning method based on the manner of creating a database at fixed points indoors according to this embodiment of the present invention.

Step 601: A collection terminal collects, at fixed points, a plurality of beacon frames (beacon frames) respectively transmitted by a plurality of WI-FI APs in an indoor positioning area, extracts a BSSID (Basic Service Set Identifier, basic service set identifier) in each beacon frame, and also obtains a plurality of signal strengths corresponding to BSSIDs (details are described below). The BSSID is a MAC (Media Access Control, Media Access Control) address of a WI-FI AP, and the WI-FI AP may be uniquely represented by the MAC address. Therefore, a BSSID can uniquely determine a WI-FI AP.

Step 602: The collection terminal sends, to a positioning server, BSSIDs of each reference point in the positioning area and corresponding signal strengths RSSIs that are collected by the collection terminal.

It should be noted that a difference between the method in which the collection terminal collects WI-FI fingerprint data in the manner of creating a database at fixed points and the method in which the collection terminal collects WI-FI fingerprint data in a manner of dynamically creating a database is as follows: In the manner of creating a database at fixed points, the collection terminal stands still and collects information at each intersection of grids drawn in the positioning area in advance, collects a plurality of pieces of WI-FI fingerprint data at a same reference point, and sends the plurality of pieces of WI-FI fingerprint data to the positioning server. In the manner of dynamically creating a database, a collector needs to move forwards quickly with the collection terminal in hand. In addition, in the manner of creating a database at fixed points, location coordinates of the collection terminal are known, and therefore location coordinates of the reference points are known, unlike the manner of dynamically creating a database in which the location coordinates of the reference points need to be calculated by the collection terminal or the positioning server.

Step 603: The positioning server calculates a variance of a plurality of WI-FI AP signal strength values at each reference point in the positioning area.

In the manner of creating a database at fixed points, location coordinates of each reference point are pre-stored on the positioning server.

Step 604: The positioning server determines a value relationship between the variance and a variance threshold. If the variance calculated by the positioning server is greater than or equal to the variance threshold, the positioning server determines that a WI-FI AP corresponding to signal strengths whose variance exceeds the variance threshold is a mobile WI-FI AP. If the variance calculated by the positioning server is greater than or equal to the variance threshold, the positioning server determines that the corresponding WI-FI AP is a mobile WI-FI AP; or if the variance is less than the variance threshold, the following step 605 is performed to continue to identify a mobile WI-FI AP. The following describes a reason in detail.

For a fixed WI-FI AP, at a same location, although a WI-FI AP signal strength fluctuates, the WI-FI AP signal strength remains within an interval range. Therefore, a signal strength variance is small. However, for a mobile WI-FI AP, in a process of creating a database at fixed points, a location of the mobile WI-FI AP constantly changes. Therefore, received signal strengths of the mobile WI-FI AP differ greatly, and a corresponding signal strength variance is large. Therefore, in this embodiment of the present invention, some mobile WI-FI APs can be learned through screening by determining a WI-FI AP signal strength variance. To be specific, if the signal strength variance is greater than or equal to the variance threshold, it is determined that the WI-FI AP is a mobile WI-FI AP; or if the signal strength variance is less than the variance threshold, whether a mobile WI-FI AP exists in the fingerprint database continues to be determined through identification.

It should be noted that step 603 and step 604 may be performed by the collection terminal. In other words, the collection terminal may calculate the variance of the plurality of WI-FI AP signal strength values at each reference point, and determine, based on the value relationship between the calculated variance and the variance threshold, whether a mobile WI-FI AP is included.

Step 605: The collection terminal sends a request to the positioning server to obtain WI-FI AP fingerprint data of a plurality of reference points in the positioning area, where the WI-FI AP fingerprint data is stored in a positioning database of the positioning server.

In the manner of creating a database at fixed points, because a plurality of data fingerprints are collected at one collection point, the plurality of collected fingerprints need to be integrated into one fingerprint as location fingerprint data representing a location of the collection point. An example of an integration method is as follows: All MAC addresses included in the plurality of fingerprint data are extracted, an average value of RSSIs corresponding to each MAC address in the plurality of fingerprints is calculated, and the RSSI average value is used as a signal strength value corresponding to the MAC address, to obtain fingerprint data including each MAC address and an RSSI average value corresponding to the MAC address.

Step 606: The collection terminal determines a signal graph of each WI-FI AP based on the plurality of pieces of WI-FI AP fingerprint data in the positioning area that are received by the collection terminal. The WI-FI AP signal graph includes coordinates of a plurality of reference points and a WI-FI AP signal strength corresponding to coordinates of each reference point.

In the location fingerprint database, each location fingerprint includes location coordinates of a reference point and a signal strength vector RSSI, as shown in Table 3. For each WI-FI AP, signal strength vectors RSSIs of the WI-FI AP and coordinates of corresponding reference points are extracted from the location fingerprint to obtain a WI-FI AP signal graph. In other words, for a WI-FI AP, a WI-FI AP signal graph includes coordinates of a plurality of reference points and WI-FI AP signal strengths corresponding to the coordinates of the reference points. Step 606 is extracting the signal graph of each WI-FI AP from the location fingerprint database.

Step 607: The collection terminal classifies WI-FI AP signal strengths into a plurality of signal strength change intervals based on a signal strength change range in the WI-FI AP signal graph.

Through a field test, an RSSI change range of a fixed WI-FI AP in the positioning area is −40 to −100 dBm. Generally, an RSSI change of one fixed WI-FI AP at one location does not exceed 10 dBm. Therefore, an RSSI interval may be set by using 10 dBm as a step. For example, when an RSSI change range of a fixed WI-FI AP in the positioning area is −52 to −98 dBm, signal strength change intervals are separately classified into [−50, −60], [−60, −70], [−70, −80], [−80, −90], and [−90, −100].

It should be noted that step 608 may be performed before step 607.

Step 608: The collection terminal separately estimates, based on coordinates of reference points corresponding to the plurality of signal strength change intervals in the WI-FI AP signal graph, a plurality of WI-FI AP locations corresponding to the plurality of signal strength change intervals.

In an example, coordinates of each reference point corresponding to the WI-FI AP are obtained based on the WI-FI AP signal graph, and the WI-FI AP location is estimated by using a weighting algorithm. A weight of the weighting algorithm is determined by a signal strength of a corresponding reference point. For details, refer to FIG. 2.

In other words, the plurality of estimated WI-FI AP locations corresponding to the plurality of signal strength change intervals are a plurality of WI-FI AP weighted average locations, and the weighted average location is weighted average coordinates obtained after a weighted value is assigned to coordinates of each reference point.

Step 609: The collection terminal determines, based on the plurality of separately estimated WI-FI AP locations corresponding to the plurality of signal strength change intervals, a plurality of divergences respectively corresponding to the plurality of signal strength change intervals.

In an example, an average value of Euclidean distances between the plurality of reference points in the WI-FI AP signal graph and the estimated WI-FI AP location is calculated, and the average value is determined as a divergence of the WI-FI AP signal graph.

Step 610: The collection terminal determines, based on a divergence of the WI-FI AP signal graph, whether the WI-FI AP is a mobile WI-FI AP.

In an example, if smaller endpoint values of a signal strength change interval obtained through division based on the WI-FI AP signal graph indicate a larger divergence corresponding to the signal strength change interval, or if larger endpoint values of a signal strength change interval obtained through division based on the WI-FI AP signal graph indicate a smaller divergence corresponding to the signal strength change interval, it is determined that the WI-FI AP is a mobile WI-FI AP.

It should be noted that in steps 603 and 604, some mobile WI-FI APs in the fingerprint database are first identified, and then whether another WI-FI AP in the fingerprint database is a mobile WI-FI AP is further determined through identification by performing steps 605 to 610.

In addition, steps 601 to 610 provide a method for creating a database at fixed points indoors and determining a mobile WI-FI AP in the newly created fingerprint database. When the mobile WI-FI AP is determined, in this embodiment of the present invention, the fingerprint database may be further updated by deleting the mobile WI-FI AP from the fingerprint database, and a positioning function is implemented based on an updated fingerprint database. In other words, this embodiment of the present invention further provides a WI-FI AP-based positioning method, and the positioning method is implemented on the basis that the mobile WI-FI AP has been deleted from the fingerprint database. The following further describes how to implement the positioning function based on the updated fingerprint database in this embodiment of the present invention.

Step 611: The collection terminal sends, to the positioning server, information about a mobile WI-FI AP learned through screening by the collection terminal.

Step 612: The positioning server deletes the mobile WI-FI AP from the fingerprint database to update the fingerprint database.

Step 613: The positioning server receives a signal strength vector RSSI from a positioning terminal.

Specifically, the positioning terminal, for example, a mobile phone with a positioning function, receives a group of WI-FI AP signals at a location in the positioning area, and signal strengths are RSSIs ($RSSI^1$, $RSSI^2$, . . . , and $RSSI^M$), where $RSSI^1$ is a signal strength of a first WI-FI AP, $RSSI^2$ is a signal strength of a second WI-FI AP, and $RSSI^M$ is a signal strength of an $M^{th}$ WI-FI AP.

Step 614: The positioning server calculates Euclidean distances $d_i$ between the signal strength vector RSSI and fingerprint data of reference points in the fingerprint database. Refer to Formula (3). A smaller Euclidean distance value indicates that a difference between a signal strength of the positioning terminal and a signal strength of a reference point is smaller and a location of the positioning terminal better matches a location of the reference point, in other words, the positioning terminal is closer to the reference point. On the contrary, the positioning terminal is more distant from the reference point.

Step 615: The positioning server arranges values of the calculated Euclidean distances in ascending order, and separately performs weighting calculation on horizontal and vertical coordinates of reference points corresponding to first n smallest values, to obtain a positioning result of the positioning terminal. For the positioning result L, refer to Formula (4). Therefore, the location of the positioning terminal is determined, and the positioning terminal is positioned accurately.

Embodiment 2 of the present invention provides a mobile WI-FI AP determining method based on the manner of creating a database at fixed points indoors, and a corresponding positioning method. In this embodiment of the present invention, the mobile WI-FI AP is learned through screening, and the mobile WI-FI AP is deleted from the fingerprint database, so that a data fingerprint of the mobile WI-FI AP destructive to positioning accuracy is deleted. In this embodiment of the present invention, a user is positioned based on a fingerprint database that includes only a fixed WI-FI AP, thereby improving positioning accuracy.

Embodiment 3

Embodiment 3 of the present invention relates to a database creation manner in an outdoor positioning scenario, and is applicable to a manner of creating a database at fixed points in the outdoor positioning scenario and a manner of dynamically creating a database in the outdoor positioning scenario.

Figure 7A:
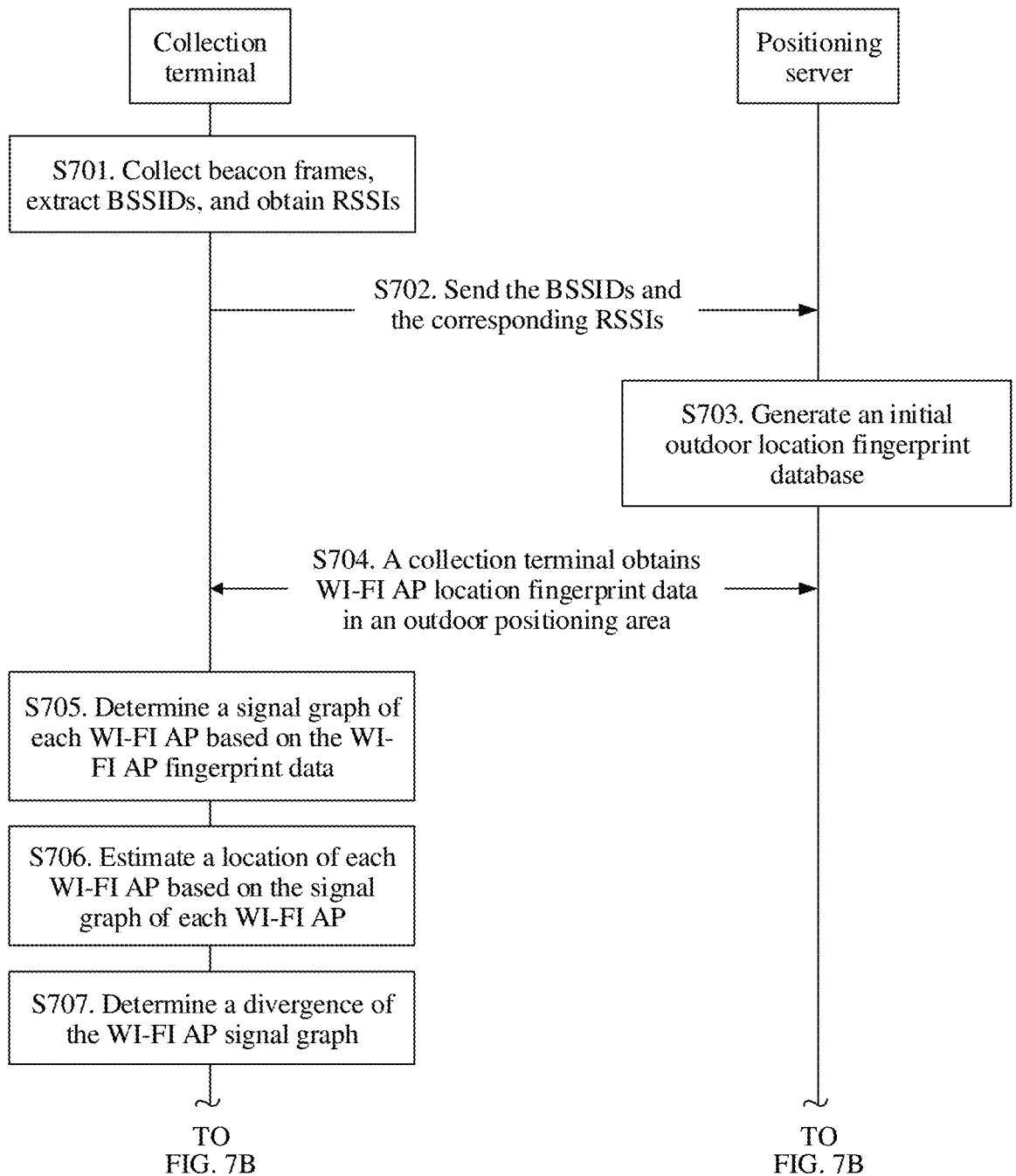
FIG. 7A and FIG. 7B are a schematic diagram of a WI-FI fingerprint positioning method based on a manner of creating a database outdoors according to an embodiment of the present invention.
Figure 7B:
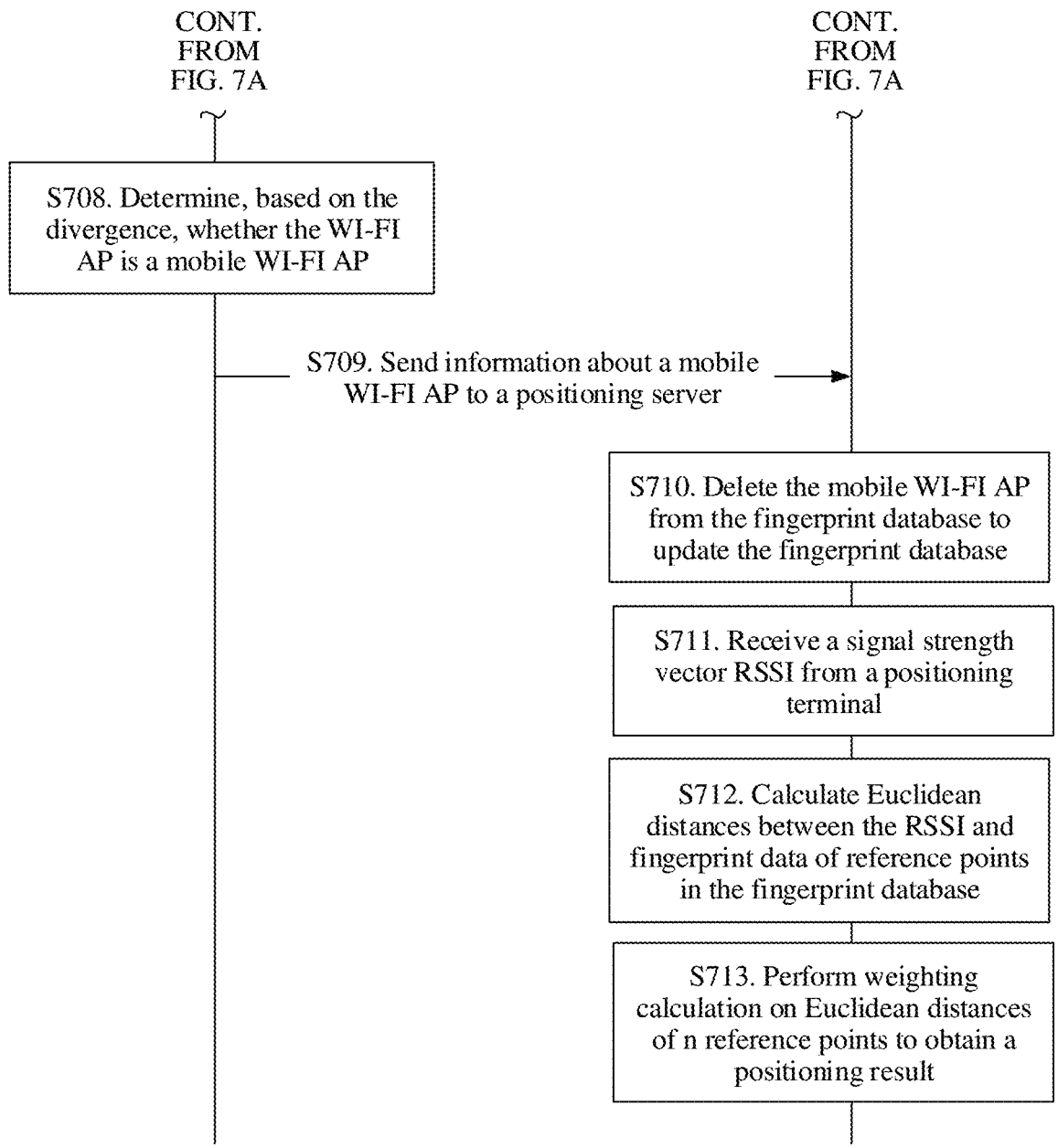

FIG. 7A and FIG. 7B are a schematic diagram of a WI-FI fingerprint positioning method based on a manner of creating a database outdoors according to this embodiment of the present invention.

Step 701: A collection terminal collects a plurality of beacon frames (beacon frames) respectively transmitted by a plurality of WI-FI APs in an outdoor positioning area, extracts a BSSID (Basic Service Set Identifier, basic service set identifier) in each beacon frame, and also obtains a plurality of signal strengths corresponding to BSSIDs (details are described below). When collecting the beacon frames, the collection terminal also obtains location coordinates of each reference point in the outdoor positioning area.

In the outdoor positioning scenario, the location coordinates are obtained by using the GPS. In a WI-FI AP fingerprint data collection process, a collector enables both GPS and WI-FI functions of the collection terminal, and records current GPS coordinates when collecting a WI-FI signal. Therefore, in the outdoor positioning scenario, the collected location coordinates of the reference point are latitude and longitude coordinates, and in an indoor positioning scenario, coordinates of a reference point are measured in meters, decimeters, or the like.

Step 702: The collection terminal sends, to a positioning server, BSSIDs of each reference point in the positioning area and corresponding signal strength vectors RSSIs that are collected by the collection terminal.

Step 703: Generate an initial outdoor location fingerprint database based on the BSSIDs of each reference point in the positioning area and the corresponding signal strength vectors RSSIs.

Step 704: The collection terminal sends a request to the positioning server to obtain WI-FI AP location fingerprint data in the outdoor positioning area.

Step 705: The collection terminal receives a plurality of pieces of WI-FI AP fingerprint data in the outdoor positioning area, and determines a signal graph of each WI-FI AP based on the plurality of pieces of WI-FI AP fingerprint data. The WI-FI AP signal graph includes coordinates of a plurality of reference points and a WI-FI AP signal strength corresponding to coordinates of each reference point.

Step 706: The collection terminal estimates a location of each WI-FI AP based on the signal graph of each WI-FI AP.

In an example, coordinates of each reference point corresponding to the WI-FI AP are obtained based on the WI-FI AP signal graph, and the WI-FI AP location is estimated by using a weighting algorithm. A weight of the weighting algorithm is determined by a signal strength of a corresponding reference point.

Step 707: The collection terminal determines a divergence of the WI-FI AP signal graph based on the estimated WI-FI AP location.

The divergence of the WI-FI AP signal graph is a divergence degree between the reference points in the WI-FI AP signal graph and the estimated WI-FI AP location, and may be determined by using an average value of Euclidean distances between the reference points in the WI-FI AP signal graph and the WI-FI AP weighted average location.

In an example, an average value of Euclidean distances between the plurality of reference points in the WI-FI AP signal graph and the estimated WI-FI AP location is calculated, and the average value is determined as the divergence of the WI-FI AP signal graph.

Step 708: The collection terminal determines, based on the divergence of the WI-FI AP signal graph, whether the WI-FI AP is a mobile WI-FI AP.

In an example, when the divergence of the WI-FI AP signal graph is greater than an outdoor divergence threshold, it is determined that the WI-FI AP is a mobile WI-FI AP. For example, a value of the outdoor divergence threshold is 60 to 100 meters.

It should be noted that step 703 to step 708 are described by using an example in which the mobile WI-FI AP is identified by the collection terminal, and actually, the mobile WI-FI AP may be identified by the positioning server. To be specific, the positioning server identifies a mobile WI-FI AP in an existing fingerprint database based on WI-FI AP fingerprint data in the fingerprint database. How the positioning server identifies the mobile WI-FI AP is the same as the method in which the collection terminal identifies the mobile WI-FI AP, and details are not described herein again.

In addition, steps 701 to 708 provide a method for creating a database outdoors and determining a mobile WI-FI AP in the newly created fingerprint database. When the mobile WI-FI AP is determined, in this embodiment of the present invention, the fingerprint database may be further updated by deleting the mobile WI-FI AP from the fingerprint database, and a positioning function is implemented based on an updated fingerprint database. In other words, this embodiment of the present invention further provides a WI-FI AP-based positioning method, and the positioning method is implemented on the basis that the mobile WI-FI AP has been deleted from the fingerprint database. The following further describes how to implement the positioning function based on the updated fingerprint database in this embodiment of the present invention.

Step 709: The collection terminal sends, to the positioning server, information about a mobile WI-FI AP learned through screening by the collection terminal.

Step 710: The positioning server deletes the mobile WI-FI AP from the fingerprint database to update the fingerprint database.

Step 711: The positioning server receives a signal strength vector RSSI from a positioning terminal.

Step 712: The positioning server calculates Euclidean distances between the signal strength vector RSSI and fingerprint data of reference points in the fingerprint database. A smaller Euclidean distance value indicates that a difference between a signal strength of the positioning terminal and a signal strength of a reference point is smaller and a location of the positioning terminal better matches a location of the reference point, in other words, the positioning terminal is closer to the reference point. On the contrary, the positioning terminal is more distant from the reference point.

Step 713: The positioning server arranges values of the calculated Euclidean distances in ascending order, and separately performs weighting calculation on horizontal and vertical coordinates of reference points corresponding to first n smallest values, to obtain a positioning result of the positioning terminal. The location of the positioning terminal can be determined based on the calculated positioning result L, thereby implementing accurate positioning of the positioning terminal.

Embodiment 3 of the present invention provides a mobile WI-FI AP determining method based on the manner of creating a database outdoors, and a corresponding positioning method. In this embodiment of the present invention, the mobile WI-FI AP is learned through screening, and the mobile WI-FI AP is deleted from the fingerprint database, so that a data fingerprint of the mobile WI-FI AP destructive to positioning accuracy is deleted. In this embodiment of the present invention, a user is positioned based on a fingerprint database that includes only a fixed WI-FI AP, thereby improving positioning accuracy.

Figure 8:
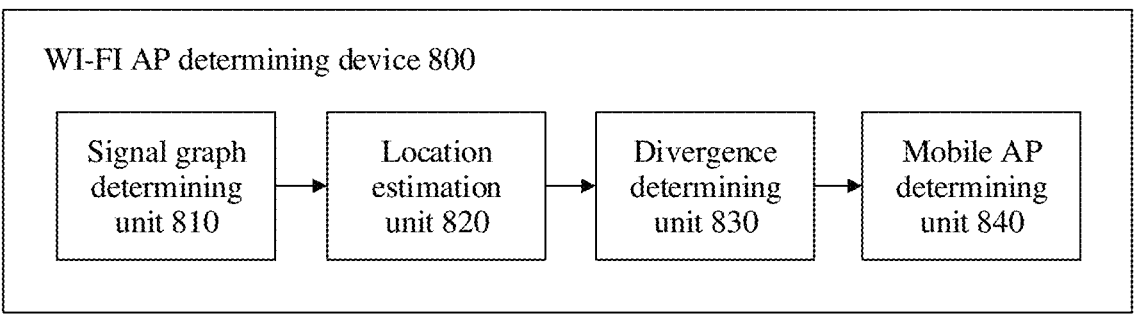
FIG. 8 shows a mobile Wireless Fidelity access point WI-FI AP determining device according to an embodiment of the present invention.

FIG. 8 is a block diagram of a mobile Wireless Fidelity access point WI-FI AP determining device according to an embodiment of the present invention.

In an example, the WI-FI AP determining device 800 may be a collection terminal or a positioning server.

The WI-FI AP determining device 80o includes a signal graph determining unit 810, a location estimation unit 820, a divergence determining unit 830, and a mobile AP determining unit 840.

The signal graph determining unit 810 is configured to determine a signal graph of each of a plurality of Wireless Fidelity access points WI-FI APs in a positioning area, where the WI-FI AP signal graph includes coordinates of a plurality of reference points and a WI-FI AP signal strength corresponding to coordinates of each reference point.

The location estimation unit 820 is configured to estimate a WI-FI AP location based on the WI-FI AP signal graph.

The divergence determining unit 830 is configured to determine a divergence of the WI-FI AP signal graph based on the estimated WI-FI AP location.

The mobile AP determining unit 840 is configured to determine, based on the divergence of the WI-FI AP signal graph, whether the WI-FI AP is a mobile WI-FI AP.

In an example, the location estimation unit 820 is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the divergence determining unit 830 is further configured to determine, based on the plurality of separately estimated WI-FI AP locations corresponding to the plurality of signal strength change intervals, a plurality of divergences respectively corresponding to the plurality of signal strength change intervals.

In an example, the mobile AP determining unit 840 is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the location estimation unit 820 is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

The location estimation unit 820 is further configured to calculate $$L^* = \sum_{i=1}^{N} w_i L_i$$

based on the WI-FI AP signal graph, to obtain the WI-FI AP location, where $L^*$ is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

and $RSS_i$ represents a signal strength of the $i^{th}$ reference point in the WI-FI AP signal graph.

In an example, the divergence determining unit 830 is further configured to: calculate an average value of Euclidean distances between the plurality of reference points in the WI-FI AP signal graph and the estimated WI-FI AP location, and determine the average value as the divergence of the WI-FI AP signal graph.

The divergence determining unit 830 is further configured to calculate $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

In an example, the signal graph determining unit 810 is further configured to: obtain a plurality of WI-FI AP signal strength values of each reference point in the positioning area; calculate a variance of the plurality of values, and when the variance is less than a variance threshold, perform the step of determining a signal graph of each of a plurality of Wireless Fidelity access points WI-FI APs in a positioning area.

In an example, the mobile AP determining unit 840 is further configured to: when the divergence is greater than an outdoor divergence threshold, determine that the WI-FI AP is a mobile WI-FI AP.

Figure 9:
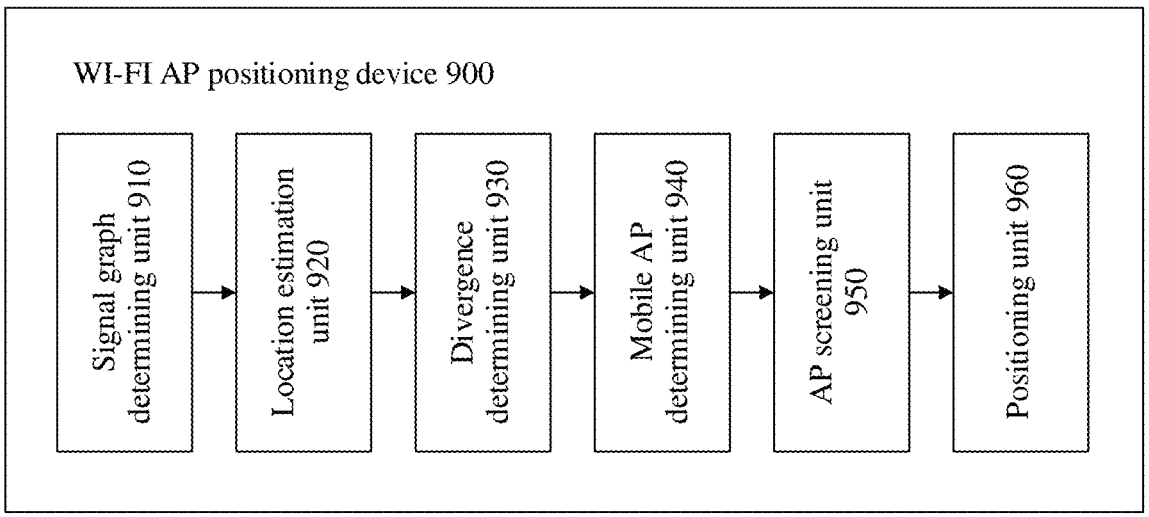
FIG. 9 shows a Wireless Fidelity WI-FI-based positioning device according to an embodiment of the present invention.

FIG. 9 is a block diagram of a Wireless Fidelity WI-FI-based positioning device according to an embodiment of the present invention. The WI-FI positioning device 910 includes a signal graph determining unit 910, a location estimation unit 920, a divergence determining unit 930, a mobile AP determining unit 940, an AP screening unit 950, and a positioning unit 960.

The signal graph determining unit 910 is configured to determine a signal graph of each of a plurality of Wireless Fidelity access points WI-FI APs in a positioning area, where the WI-FI AP signal graph includes coordinates of a plurality of reference points and a WI-FI AP signal strength corresponding to coordinates of each reference point.

The location estimation unit 920 is configured to estimate a WI-FI AP location based on the WI-FI AP signal graph.

The divergence determining unit 930 is configured to determine a divergence of the WI-FI AP signal graph based on the estimated WI-FI AP location.

The mobile AP determining unit 940 is configured to determine, based on the divergence of the WI-FI AP signal graph, whether the WI-FI AP is a mobile WI-FI AP.

The AP screening unit 950 is configured to: when the WI-FI AP is a mobile WI-FI AP, delete the mobile WI-FI AP from a fingerprint database.

The positioning unit 960 is configured to match an obtained signal strength in the positioning area with a signal strength of each reference point in the fingerprint database, to determine a positioning result of an apparatus whose signal strength is obtained.

In an example, the location estimation unit 920 is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the divergence determining unit 930 is further configured to determine, based on the plurality of separately estimated WI-FI AP locations corresponding to the plurality of signal strength change intervals, a plurality of divergences respectively corresponding to the plurality of signal strength change intervals.

In an example, the mobile AP determining unit 940 is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the location estimation unit 920 is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the divergence determining unit 930 is further configured to: calculate an average value of Euclidean distances between the plurality of reference points in the WI-FI AP signal graph and the estimated WI-FI AP location, and determine the average value as the divergence of the WI-FI AP signal graph.

In an example, the signal graph determining unit 910 is further configured to: obtain a plurality of WI-FI AP signal strength values of each reference point in the positioning area; calculate a variance of the plurality of values, and when the variance is less than a variance threshold, perform the step of determining a signal graph of each of a plurality of Wireless Fidelity access points WI-FI APs in a positioning area.

In an example, the mobile AP determining unit 940 is further configured to: when the divergence is greater than an outdoor divergence threshold, determine that the WI-FI AP is a mobile WI-FI AP.

In the embodiments of the present invention, the mobile AP in the WI-FI fingerprint database can be identified. Fingerprint data of the mobile AP is destructive to WI-FI fingerprint positioning. Therefore, in the embodiments of the present invention, the mobile AP is deleted from the WI-FI fingerprint database, so that quality of the WI-FI fingerprint database is improved to improve WI-FI fingerprint positioning accuracy, and a data volume of the WI-FI fingerprint database is reduced to reduce computational complexity.

Figure 10:
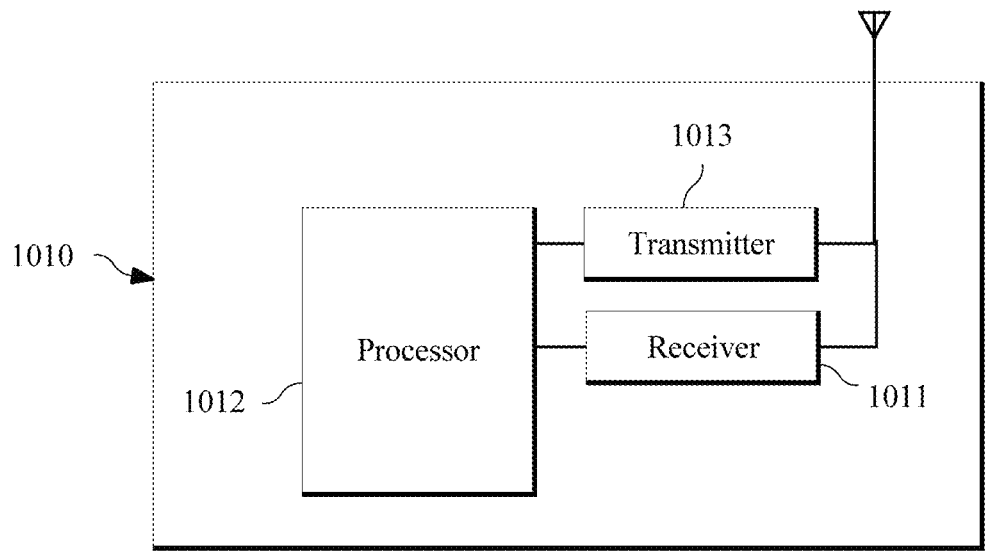
FIG. 10 is a schematic diagram of a collection terminal according to an embodiment of the present invention.

FIG. 10 is a schematic diagram of a collection terminal according to an embodiment of the present invention. The collection terminal 1010 includes a receiver 1011, a processor 1012, and a transmitter 1013.

The receiver 1011 is configured to receive broadcast frames from a plurality of Wireless Fidelity access points WI-FI APs in a positioning area.

The processor 1012 is configured to: determine a signal graph of a corresponding WI-FI AP based on the broadcast frames corresponding to the WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; and determine, based on the divergence of the WI-FI AP signal graph, whether the WI-FI AP is a mobile WI-FI AP.

The transmitter 1013 is configured to send information about a determined mobile WI-FI AP to a positioning server.

In an example, the processor 1012 is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor 1012 is further configured to determine, based on the plurality of separately estimated WI-FI AP locations corresponding to the plurality of signal strength change intervals, a plurality of divergences respectively corresponding to the plurality of signal strength change intervals.

In an example, the processor 1012 is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor 1012 is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor 1012 is further configured to calculate $$L^* = \sum_{i=1}^{N} w_i L_i$$

based on the WI-FI AP signal graph, to obtain the WI-FI AP location, where $L^*$ is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the processor 1012 is further configured to: calculate an average value of Euclidean distances between the plurality of reference points in the WI-FI AP signal graph and the estimated WI-FI AP location, and determine the average value as the divergence of the WI-FI AP signal graph.

In an example, that the processor 1012 determines a divergence of the WI-FI AP signal graph based on the estimated WI-FI AP location is specifically: calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

In an example, the receiver 1011 is further configured to receive a plurality of WI-FI AP signal strength values of each reference point in the positioning area; and the processor 1012 is further configured to: calculate a variance of the plurality of values, and when the variance is less than a variance threshold, perform the step of determining a signal graph of each of a plurality of Wireless Fidelity access points WI-FI APs in a positioning area.

In an example, the processor 1012 is further configured to: when the divergence is greater than an outdoor divergence threshold, determine that the WI-FI AP is a mobile WI-FI AP.

Figure 11:
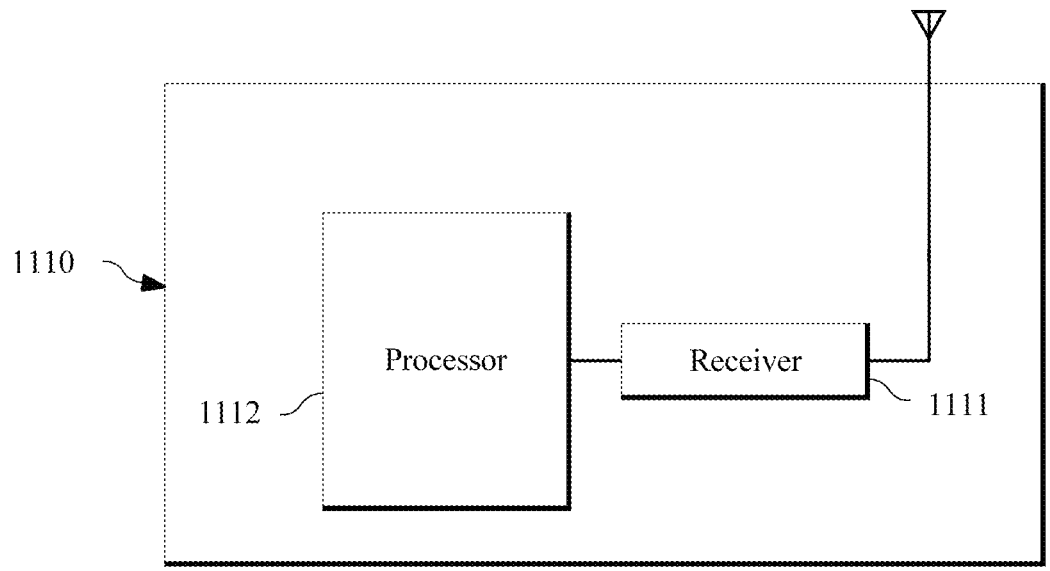
FIG. 11 is a schematic diagram of a positioning server according to an embodiment of the present invention.

FIG. 11 is a schematic diagram of a positioning server according to an embodiment of the present invention. The positioning server 1110 includes a receiver 1111 and a processor 1112.

The receiver 1111 is configured to receive broadcast frames from a plurality of Wireless Fidelity access points WI-FI APs in a positioning area.

The processor 1112 is configured to: determine a signal graph of a corresponding WI-FI AP based on the broadcast frames corresponding to the WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; and determine, based on the divergence of the WI-FI AP signal graph, whether the WI-FI AP is a mobile WI-FI AP.

In an example, the processor 1112 is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor 1112 is further configured to determine, based on the plurality of separately estimated WI-FI AP locations corresponding to the plurality of signal strength change intervals, a plurality of divergences respectively corresponding to the plurality of signal strength change intervals.

In an example, the processor 1112 is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor 1112 is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor 1112 is further configured to calculate $$L^* = \sum_{i=1}^{N} w_i L_i$$

based on the WI-FI AP signal graph, to obtain the WI-FI AP location, where $L^*$ is the estimated WI-FI AP location, $L_i$ is coordinates of an $i^{th}$ reference point in the WI-FI AP signal graph, $W_i$ is a weight corresponding to the coordinates of the $i^{th}$ reference point in the WI-FI AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the WI-FI AP signal graph, and $RSS_j$ represents a signal strength of a $j^{th}$ reference point in the WI-FI AP signal graph.

In an example, the processor 1112 is further configured to: calculate an average value of Euclidean distances between the plurality of reference points in the WI-FI AP signal graph and the estimated WI-FI AP location, and determine the average value as the divergence of the WI-FI AP signal graph.

In an example, that the processor 1112 determines a divergence of the WI-FI AP signal graph based on the estimated WI-FI AP location is specifically: calculating $$div_j = \frac{\sum_{i=1}^{N_j} \sqrt{(L_i(x) - L^*(x))^2 + (L_i(y) - L^*(y))^2}}{N_j},$$

where $div_j$ is the divergence of the WI-FI AP signal graph, $L_i(x)$ is a horizontal coordinate of the $i^{th}$ reference point in the WI-FI AP signal graph, $L_i(y)$ is a vertical coordinate of the $i^{th}$ reference point in the WI-FI AP signal graph, $L^*(x)$ is a horizontal coordinate of the estimated WI-FI AP location, $L^*(y)$ is a vertical coordinate of the estimated WI-FI AP location, and $N_j$ is a quantity of reference points.

In an example, the receiver 1111 is further configured to receive a plurality of WI-FI AP signal strength values of each reference point in the positioning area; and the processor 1012 is further configured to: calculate a variance of the plurality of values, and when the variance is less than a variance threshold, perform the step of determining a signal graph of each of a plurality of Wireless Fidelity access points WI-FI APs in a positioning area.

In an example, the processor 1112 is further configured to: when the divergence is greater than an outdoor divergence threshold, determine that the WI-FI AP is a mobile WI-FI AP.

Figure 12:
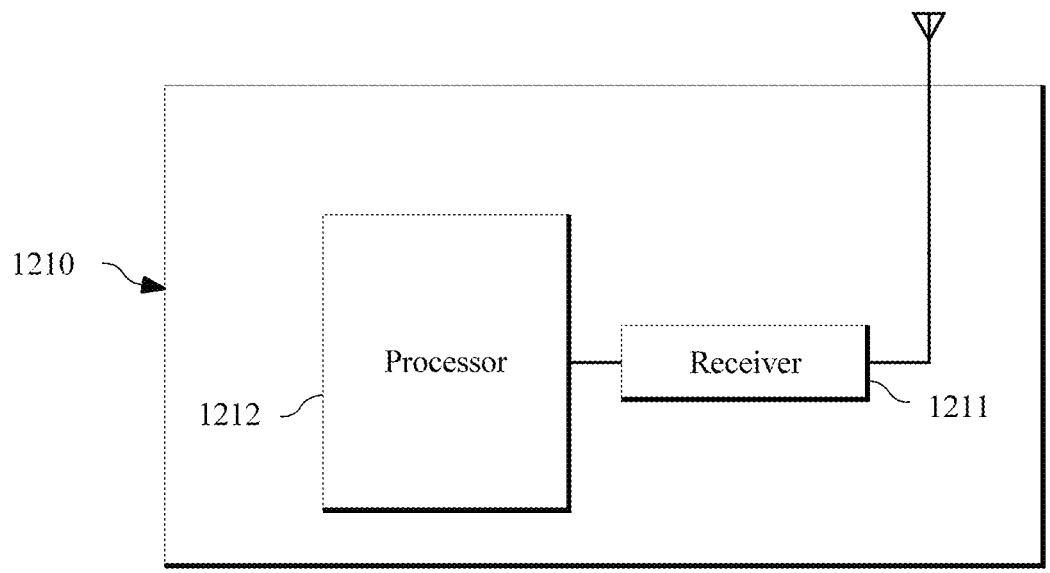
FIG. 12 is a schematic diagram of a positioning server according to another embodiment of the present invention.

FIG. 12 is a schematic diagram of a positioning server according to another embodiment of the present invention. The positioning server 1210 includes a receiver 1211 and a processor 1212.

The receiver 1211 is configured to receive broadcast frames from a plurality of Wireless Fidelity access points WI-FI APs.

The processor 1212 is configured to: determine a signal graph of a corresponding WI-FI AP based on the broadcast frames of the plurality of WI-FI APs, where the WI-FI AP signal graph includes coordinates of a plurality of reference points and a WI-FI AP signal strength corresponding to coordinates of each reference point; estimate a WI-FI AP location based on the WI-FI AP signal graph; determine a divergence of the WI-FI AP signal graph based on the estimated WI-FI AP location; determine, based on the divergence of the WI-FI AP signal graph, whether the WI-FI AP is a mobile WI-FI AP; when the WI-FI AP is a mobile WI-FI AP, delete the mobile WI-FI AP from a fingerprint database; and match an obtained signal strength in a positioning area with a signal strength of each reference point in the fingerprint database, to determine a positioning result of an apparatus whose signal strength is obtained.

In an example, the processor 1212 is further configured to: divide a signal strength change range in the WI-FI AP signal graph into a plurality of signal strength change intervals; and separately estimate, based on coordinates of reference points corresponding to the plurality of signal strength change intervals, a plurality of WI-FI AP locations corresponding to the plurality of signal strength change intervals.

In an example, the processor 1212 is further configured to determine, based on the plurality of separately estimated WI-FI AP locations corresponding to the plurality of signal strength change intervals, a plurality of divergences respectively corresponding to the plurality of signal strength change intervals.

In an example, the processor 1212 is further configured to: if smaller endpoint values of a signal strength change interval indicate a larger divergence corresponding to the signal strength change interval, or if larger endpoint values of a signal strength change interval indicate a smaller divergence corresponding to the signal strength change interval, determine that the WI-FI AP is a mobile WI-FI AP.

In an example, the processor 1212 is further configured to: obtain, based on the WI-FI AP signal graph, coordinates of each reference point corresponding to the WI-FI AP, and estimate the WI-FI AP location by using a weighting algorithm, where a weight of the weighting algorithm is determined by a signal strength of a corresponding reference point.

In an example, the processor 1212 is further configured to: calculate an average value of Euclidean distances between the plurality of reference points in the WI-FI AP signal graph and the estimated WI-FI AP location, and determine the average value as the divergence of the WI-FI AP signal graph.

In an example, the receiver 1211 is further configured to obtain a plurality of WI-FI AP signal strength values of each reference point in the positioning area. The processor 1212 is further configured to: calculate a variance of the plurality of values, and when the variance is less than a variance threshold, perform the step of determining a signal graph of each of a plurality of Wireless Fidelity access points WI-FI APs in a positioning area.

In an example, the processor 1212 is further configured to: when the divergence is greater than an outdoor divergence threshold, determine that the WI-FI AP is a mobile WI-FI AP.

In an example, the processor 1212 is further configured to: calculate a Euclidean distance $$d_i = \frac{\sqrt{\sum_{j=1}^{M}(RSSI^j - RSS_i^j)^2}}{M}, i = 1, 2, \ldots, N,$$

where $RSSI^j$ is a signal strength of a $j^{th}$ WI-FI AP at an $I^{th}$ reference point in the positioning area, $RSS_i^j$ is a signal strength of the $j^{th}$ WI-FI AP at an $i^{th}$ reference point in the fingerprint database, N is a quantity of reference points in the fingerprint database, and M is a quantity of WI-FI APs in the fingerprint database; and obtain n shortest Euclidean distances from the Euclidean distance $d_i$ to obtain the positioning result L, where $$L = \sum_{i=1}^{n} w_i d_i, w_i = \frac{1/RSS_i}{\sum_{j=1}^{N} 1/RSS_j}, i = 1, 2, \ldots, N,$$

$RSS_i$ represents a signal strength of an $i^{th}$ reference point in the WI-FI AP signal graph, and $RSS_j$ represents a signal strength of a $j^{th}$ reference point in the WI-FI AP signal graph.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

A person of ordinary skill in the art may understand that all or some of the steps in each of the foregoing method of the embodiments may be implemented by a program instructing a processor. The program may be stored in a computer readable storage medium. The storage medium may be a non-transitory) medium, such as a random-access memory, a read-only memory, a flash memory, a hard disk, a solid state drive, a magnetic tape, a floppy disk, an optical disc, or any combination thereof.

The foregoing descriptions are merely example implementations of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method, comprising:
   determining a respective signal graph of each of a plurality of wireless local area network (WLAN) access points (APs) in a positioning area, wherein each respective WLAN AP signal graph comprises coordinates of a respective plurality of reference points and a WLAN AP signal strength corresponding to coordinates of each reference point of the respective plurality of references points;
   estimating a WLAN AP location of a first WLAN AP based on a first WLAN AP signal graph corresponding to the first WLAN AP, to obtain an estimated WLAN AP location of the first WLAN AP;
   determining a divergence of the first WLAN AP signal graph based on the estimated WLAN AP location of the first WLAN AP; and
   determining, based on the divergence of the first WLAN AP signal graph, whether the first WLAN AP is a mobile WLAN AP.

2. The method according to claim 1, wherein estimating the WLAN AP location of the first WLAN AP based on the first WLAN AP signal graph comprises:
   dividing a signal strength change range in the first WLAN AP signal graph into a plurality of signal strength change intervals; and
   separately estimating, based on coordinates of reference points corresponding to the plurality of signal strength change intervals, a plurality of WLAN AP locations corresponding to the plurality of signal strength change intervals, to obtain a plurality of separately estimated WLAN AP locations corresponding to the plurality of signal strength change intervals.

3. The method according to claim 2, wherein determining the divergence of the first WLAN AP signal graph based on the estimated WLAN AP location of the first WLAN AP comprises:
   determining, based on the plurality of separately estimated WLAN AP locations corresponding to the plurality of signal strength change intervals, a plurality of divergences respectively corresponding to the plurality of signal strength change intervals.

4. The method according to claim 3, wherein determining, based on the divergence of the first WLAN AP signal graph, whether the first WLAN AP is a mobile WLAN AP comprises:
   when smaller endpoint values of a signal strength change interval of the plurality of signal strength change intervals indicate a larger divergence corresponding to the signal strength change interval, or when larger endpoint values of a signal strength change interval of the plurality of signal strength change intervals indicate a smaller divergence corresponding to the signal strength change interval, determining that the first WLAN AP is a mobile WLAN AP.

5. The method according to claim 1, wherein estimating the WLAN AP location of the first WLAN AP based on the first WLAN AP signal graph comprises:
   obtaining, based on the first WLAN AP signal graph, coordinates of each reference point corresponding to the first WLAN AP, and estimating the WLAN AP location of the first WLAN AP using a weighting algorithm, wherein a weight of the weighting algorithm is determined by a signal strength of a corresponding reference point.

6. The method according to claim 1, wherein estimating the WLAN AP location of the first WLAN AP based on the first WLAN AP signal graph comprises:
   calculating $$L^* = \sum_{i=1}^{N} w_i L_i$$

based on the first WLAN AP signal graph, to obtain the WLAN AP location of the first WLAN AP, wherein $L^*$ is the estimated WLAN AP location of the first WLAN AP, $L_i$ is coordinates of an $i^{th}$ reference point in the first WLAN AP signal graph, $w_i$ is a weight corresponding to the coordinates of the $i^{th}$ reference point in the first WLAN AP signal graph, $$w_i = \frac{1/RSS_i}{\sum_{j=1}^{N} 1/RSS_j}, i = 1, 2, \ldots, N,$$

$RSS_i$ represents a signal strength of the $i^{th}$ reference point in the first LAN AP signal graph, and $RSS_j$ represents a signal strength of a $j^{th}$ reference point in the first WLAN AP signal graph.

7. The method according to claim 1, wherein determining the divergence of the first WLAN AP signal graph based on the estimated WLAN AP location of the first WLAN AP comprises:
   calculating an average value of Euclidean distances between the plurality of respective reference points in the first WLAN AP signal graph and the estimated WLAN AP location of the first WLAN AP, and determining the average value as the divergence of the first WLAN AP signal graph.

8. The method according to claim 1, wherein determining the divergence of the first WLAN AP signal graph based on the estimated WLAN AP location of the first WLAN AP comprises:
   calculating $$div_j = \frac{\sum_{i=1}^{N_j} \sqrt{(L_i(x) - L^*(x))^2 + (L_i(y) - L^*(y))^2}}{N_j},$$

wherein $div_j$ is the divergence of the first WLAN AP signal graph, $L_i(x)$ is a horizontal coordinate of an $i^{th}$ reference point in the first W WLAN AP signal graph, $L_i(y)$ is a vertical coordinate of the $i^{th}$ reference point in the first WLAN AP signal graph, $L^*(x)$ is a horizontal coordinate of the estimated WLAN AP location of the first WLAN AP, L*(y) is a vertical coordinate of the estimated WLAN AP location of the first WLAN AP, and $N_j$ is a quantity of reference points.

9. The method according to claim 1, wherein before determining the respective signal graph of each of the plurality of WLAN APs in the positioning area, the method further comprises:
obtaining a plurality of WLAN AP signal strength values of each reference point in the positioning area; and
calculating a variance of the plurality of WLAN AP signal strength values; and
wherein determining the respective signal graph of each of the plurality of WLAN APs in the positioning area comprises:
when the variance is less than a variance threshold, determining the respective signal graph of each of the plurality of WLAN APs in the positioning area.

10. The method according to claim 1, wherein determining, based on the divergence of the first WLAN AP signal graph, whether the first WLAN AP is a mobile WLAN AP comprises:
when it is determined that the divergence is greater than an outdoor divergence threshold, determining that the first WLAN AP is a mobile WLAN AP.

11. A method, comprising:
determining a respective signal graph of each of a plurality of wireless local area network (WLAN) access points (APs) in a positioning area, wherein each respective WLAN AP signal graph comprises coordinates of a respective plurality of reference points and a WLAN AP signal strength corresponding to coordinates of each reference point of the respective plurality of references points;
estimating a WLAN AP location of a first WLAN AP based on a first WLAN AP signal graph corresponding to the first WLAN AP, to obtain an estimated WLAN AP location of the first WLAN AP;
determining a divergence of the first WLAN AP signal graph based on the estimated WLAN AP location of the first WLAN AP;
determining, based on the divergence of the first WLAN AP signal graph, whether the first WLAN AP is a mobile WLAN AP;
when it is determined that the first WLAN AP is a mobile WLAN AP, deleting fingerprint data of the mobile WLAN AP from a fingerprint database; and
matching a first signal strength in the positioning area with a signal strength of each reference point in the fingerprint database, to determine a positioning result of an apparatus corresponding to the first signal strength.

12. The method according to claim 11, wherein estimating the WLAN AP location of the first WLAN AP based on the first WLAN AP signal graph comprises:
dividing a signal strength change range in the first WLAN AP signal graph into a plurality of signal strength change intervals; and
separately estimating, based on coordinates of reference points corresponding to the plurality of signal strength change intervals, a plurality of WLAN AP locations corresponding to the plurality of signal strength change intervals.

13. The method according to claim 12, wherein determining the divergence of the first WLAN AP signal graph based on the estimated WLAN AP location of the first WLAN AP comprises:
determining, based on the plurality of separately estimated WLAN AP locations corresponding to the plurality of signal strength change intervals, a plurality of divergences respectively corresponding to the plurality of signal strength change intervals.

14. The method according to claim 13, wherein determining, based on the divergence of the first WLAN AP signal graph, whether the first WLAN AP is a mobile WLAN AP comprises:
when smaller endpoint values of a signal strength change interval of the plurality of signal strength change intervals indicate a larger divergence corresponding to the signal strength change interval, or when larger endpoint values of a signal strength change interval of the plurality of signal strength change intervals indicate a smaller divergence corresponding to the signal strength change interval, determining that the first WLAN AP is a mobile WLAN AP.

15. The method according to claim 11, wherein estimating the WLAN AP location of the first WLAN AP based on the first WLAN AP signal graph comprises:
obtaining, based on the first WLAN AP signal graph, coordinates of each reference point corresponding to the first WLAN AP, and estimating the WLAN AP location of the first WLAN AP using a weighting algorithm, wherein a weight of the weighting algorithm is determined by a signal strength of a corresponding reference point.

16. The method according to claim 11, wherein determining the divergence of the first WLAN AP signal graph based on the estimated WLAN AP location of the first WLAN AP comprises:
calculating an average value of Euclidean distances between the plurality of respective reference points in the first WLAN AP signal graph and the estimated WLAN AP location of the first WLAN AP, and determining the average value as the divergence of the first WLAN AP signal graph.

17. The method according to claim 11, before determining the respective signal graph of each of the plurality of WLAN APs in the positioning area, the method further comprises:
obtaining a plurality of WLAN AP signal strength values of each reference point in the positioning area; and
calculating a variance of the plurality of WLAN AP signal strength values; and
wherein determining the respective signal graph of each of the plurality of WLAN APs in the positioning area comprises:
when the variance is less than a variance threshold, determining the respective signal graph of each of the plurality of WLAN APs in the positioning area.

18. The method according to claim 11, wherein determining, based on the divergence of the first WLAN AP signal graph, whether the first WLAN AP is a mobile WLAN AP comprises:
when the divergence is greater than an outdoor divergence threshold, determining that the first WLAN AP is a mobile WLAN AP.

19. The method according to claim 11, wherein matching the first signal strength in the positioning area with a signal strength of each reference point in the fingerprint database, to determine a positioning result of an apparatus corresponding to the first signal strength, comprises:

calculating a Euclidean distance according to the relation:

$$d_i = \frac{\sqrt{\sum_{j=1}^{M}(RSSI^j - RSS_i^j)^2}}{M}, i = 1, 2, \ldots, N,$$

wherein $RSSI^j$ is a signal strength of a $j^{th}$ WLAN AP at an $I^{th}$ reference point in the positioning area, $RSS_i^j$ is a signal strength of the $j^{th}$ WLAN AP at an $i^{th}$ reference point in the fingerprint database, N is a quantity of reference points in the fingerprint database, and M is a quantity of WLAN APs corresponding to the fingerprint database; and obtaining n shortest Euclidean distances from the Euclidean distance $d_i$ to obtain a positioning result L, wherein $$L = \sum_{i=1}^{n} w_i d_i, w_i = \frac{1/RSS_i}{\sum_{j=1}^{N} 1/RSS_j}, i = 1, 2, \ldots, N,$$

$RSS_i$ represents a signal strength of an $i^{th}$ reference point in the first WLAN AP signal graph, and $RSS_j$ represents a signal strength of a $j^{th}$ reference point in the first WLAN i AP signal graph.

20. A device, comprising:

a non-transitory memory comprising instructions; and at least one processor coupled to the non-transitory memory, wherein when instructions are executed by the at least one processor, the instructions cause the device to:

determine a respective signal graph of each of a plurality of wireless local area network (WLAN) access points (APS) in a positioning area, wherein each respective WLAN AP signal graph comprises coordinates of a respective plurality of reference points and a WLAN AP signal strength corresponding to coordinates of each reference point of the respective plurality of references points;

estimate a WLAN AP location of a first WLAN AP based on a first WLAN AP signal graph, to obtain an estimated WLAN AP location of the first WLAN AP;

determine a divergence of the first WLAN AP signal graph based on the estimated WLAN AP location; and determine, based on the divergence of the first WLAN AP signal graph, whether the first WLAN AP is a mobile WLAN AP.

* * * * *

UNITED STATES PATENT AND TRADEMARK OFFICE
CERTIFICATE OF CORRECTION

PATENT NO. : 10,925,029 B2
APPLICATION NO. : 16/472745
DATED : February 16, 2021
INVENTOR(S) : Yunsheng Kuang Page 1 of 1

It is certified that error appears in the above-identified patent and that said Letters Patent is hereby corrected as shown below:

In the Claims

In Column 36, Line 38, Claim 6, delete "LAN AP signal graph" and insert --WLAN AP signal graph--.

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*